US009346991B2

(12) United States Patent
Arzberger et al.

(10) Patent No.: US 9,346,991 B2
(45) Date of Patent: May 24, 2016

(54) THERMAL INTERFACE MATERIALS AND SYSTEMS AND DEVICES CONTAINING THE SAME

(75) Inventors: Steven C. Arzberger, Denver, CO (US); Sayangdev Naha, Littleton, CO (US); Douglas Campbell, Longmont, CO (US)

(73) Assignee: ADA Technologies, Inc., Littleton, CO (US)

( * ) Notice: Subject to any disclaimer, the term of this patent is extended or adjusted under 35 U.S.C. 154(b) by 857 days.

(21) Appl. No.: 13/448,257

(22) Filed: Apr. 16, 2012

(65) Prior Publication Data

US 2012/0263940 A1 Oct. 18, 2012

Related U.S. Application Data

(60) Provisional application No. 61/475,502, filed on Apr. 14, 2011.

(51) Int. Cl.
*H01B 1/02* (2006.01)
*H01B 1/04* (2006.01)
*C09K 5/14* (2006.01)
*B82Y 30/00* (2011.01)

(52) U.S. Cl.
CPC .. *C09K 5/14* (2013.01); *H01B 1/02* (2013.01); *H01B 1/04* (2013.01); *B32B 2307/302* (2013.01); *B82Y 30/00* (2013.01); *Y10T 428/25* (2015.01); *Y10T 428/256* (2015.01); *Y10T 428/259* (2015.01)

(58) Field of Classification Search
None
See application file for complete search history.

(56) References Cited

U.S. PATENT DOCUMENTS

| 6,523,608 | B1 | 2/2003 | Solbrekken et al. |
| 6,673,434 | B2 | 1/2004 | Nguyen |
| 6,891,724 | B2 | 5/2005 | De Lorenzo et al. |
| 7,009,289 | B2 | 3/2006 | Hu et al. |
| 7,168,484 | B2 | 1/2007 | Zhang et al. |
| 7,351,360 | B2 | 4/2008 | Hougham et al. |
| 7,504,453 | B2 | 3/2009 | Hu et al. |
| 7,695,817 | B2 | 4/2010 | Lin et al. |
| 7,886,813 | B2 | 2/2011 | Hua et al. |
| 8,080,499 | B2 | 12/2011 | Lu et al. |
| 8,242,372 | B2 | 8/2012 | Leu et al. |
| 8,389,119 | B2 | 3/2013 | Panzer et al. |
| 8,445,102 | B2 | 5/2013 | Strader et al. |
| 2003/0118826 | A1 | 6/2003 | Greinke et al. |
| 2003/0151030 | A1 | 8/2003 | Gurin |
| 2003/0216502 | A1 | 11/2003 | McElrath et al. |
| 2004/0060691 | A1 | 4/2004 | Chiu et al. |

(Continued)

FOREIGN PATENT DOCUMENTS

| EP | 1291913 | 3/2003 |
| EP | 1329953 | 7/2003 |

(Continued)

OTHER PUBLICATIONS

"Thermally Conductive Greases," Dow Corning, Jun. 2008, 38 pages.

(Continued)

*Primary Examiner* — Mark Kopec
*Assistant Examiner* — Jaison Thomas
(74) *Attorney, Agent, or Firm* — Sheridan Ross P.C.

(57) ABSTRACT

This disclosure relates generally to thermally conductive polymer composites and particularly to thermal interface materials.

46 Claims, 19 Drawing Sheets

(56) References Cited

U.S. PATENT DOCUMENTS

| | | | |
|---|---|---|---|
| 2006/0112857 | A1 | 6/2006 | Hougham et al. |
| 2006/0155043 | A1 | 7/2006 | Johnson et al. |
| 2007/0012900 | A1* | 1/2007 | Callen et al. ............... 252/500 |
| 2007/0265379 | A1 | 11/2007 | Chen et al. |
| 2008/0170982 | A1 | 7/2008 | Zhang et al. |
| 2008/0236804 | A1 | 10/2008 | Cola et al. |
| 2010/0128439 | A1 | 5/2010 | Tilak et al. |
| 2010/0140792 | A1 | 6/2010 | Haddon et al. |
| 2010/0208432 | A1 | 8/2010 | Bhagwagar et al. |
| 2010/0314587 | A1 | 12/2010 | Carroll et al. |
| 2011/0007477 | A1 | 1/2011 | Xu et al. |
| 2011/0020539 | A1 | 1/2011 | Fisher et al. |
| 2012/0018666 | A1 | 1/2012 | Kuczynski et al. |
| 2012/0063103 | A1 | 3/2012 | Kirk |
| 2012/0080639 | A1* | 4/2012 | Bruzda et al. ............... 252/70 |
| 2012/0231270 | A1 | 9/2012 | Dhinojwala et al. |
| 2012/0251432 | A1 | 10/2012 | Cooper et al. |
| 2012/0276327 | A1 | 11/2012 | Cola et al. |
| 2013/0256868 | A1 | 10/2013 | Aliyev |
| 2013/0264041 | A1 | 10/2013 | Zhamu et al. |
| 2014/0084205 | A1* | 3/2014 | Singh et al. ............... 252/74 |

FOREIGN PATENT DOCUMENTS

| | | |
|---|---|---|
| EP | 2162910 | 6/2013 |
| JP | 2007-516314 | 6/2007 |
| JP | 2008-502779 | 1/2008 |
| JP | 2008-502816 | 1/2008 |
| WO | WO 03/060035 | 7/2003 |
| WO | WO 2004/106420 | 12/2004 |
| WO | WO 2005/123825 | 12/2005 |
| WO | WO 2006/002014 | 1/2006 |

OTHER PUBLICATIONS

Acik et al. "A Review on Thermal Exfoliation of Graphene Oxide," Journal of Materials Science Research, Jan. 2013, vol. 2, No. 1, pp. 101-112.

Bennion et al. "Integrated Vehicle Thermal Management for Advanced Vehicle Propulsion Technologies," National Renewable Energy Laboratory, Feb. 2010, 18 pages.

Chiang "Design and Characterization of Nanowire Array as Thermal Interface material for Electronics Packaging," M.S. Thesis, Texas A&M University, Dec. 2008, 168 pages.

Chung "Materials for thermal conduction," Applied Thermal Engineering, Nov. 2001, vol. 21, No. 15,pp. 1593-1605.

Clancy et al. "Multiscale modeling of Thermal Conductivity of Polymer/Graphene Nanocomposites," NASA Technical Reports Server (NTRS), 2010, 23 pages.

Cola et al. "Nanoscale Polymer Coatings for Enhanced Bonding and Thermal Conductance in Carbon Nanotube Array Interfaces," IMAPS Workshop on Thermal management, Nov. 9-11, Palo Alto, CA, 25 pages.

Drzal "Graphene Nanoplatelets: A Multi-functional Nanomaterial Additive for Polymers and Composites," XG sciences, Aug. 2012, 33 pages.

Du et al. "The Fabrication, Properties, and Uses of Graphene/Polymer Composites," Macromolecular Chemistry and Physics, Jun. 2012, vol. 213, No. 10-11, pp. 1060-1077.

Fan et al. "Thermal Pyrolytic Graphite Composite with Coefficient of Thermal Expansion Matching for Advanced Thermal Management," IMAPS Workshop on Thermal Management, Nov. 9-11, 2011, Palo Alto, CA, 17 pages.

Gwinn et al. Performance and testing of thermal interface materials, Microelectronics Journal, Mar. 2003, vol. 34, No. 3, pp. 215-222.

Hay "CU MetGraf Composites for Printed Circuit Board Thermal Control," IMAPS Workshop on Thermal Management, Nov. 9-11, 2011, Palo Alto, CA, 32 pages.

Hong et al. "Highly stable, concentrated dispersions of graphene oxide sheets and their electro-responsive characteristics," Soft Matter, Jul. 2012, vol. 8, No. 28, Supplementary Information, pp. S1-S9.

Hornung "Thermal Interface Dynamics of Copper in Aluminum heat Sinks," Tyco Electronics, Intel Technology Symposium, 2004, 22 pages.

Hu et al. "Flexible graphite modified by carbon black paste for use as a thermal interface material," Carbon, Apr. 2011, vol. 49, No. 4, pp. 1075-1086.

Kiran et al. "Enhancement of commercially-available thermal grease by Multiwalled carbon nanotubes for electronic device applications," Advanced Material Letters, Jan. 2013, vol. 4, No. 1, 5 pages.

Klett et al. "Thermal Management Solutions Utilizing High Thermal Conductivity Graphite Foams," Publisher Unknown, 2000, 11 pages.

Konatham et al. "Simulation insights into thermally conductive graphene-based nanocomposites," Molecular Physics, Jan. 2011, vol. 109, No. 1, pp. 97-111.

Konatham et al. "Thermal bourndary resistance at the graphene-oil interface," Aplied Physics Letters, Oct. 2009, vol. 95, No. 16, 4 pages.

Kuilla et al. "Recent advances in graphene based polymer composites," Progress in Polymer Science, Nov. 2010, vol. 35, No. 11, pp. 1350-1375.

Lara-Curzio et al. "Graphite-based Thermal Management System Components for Fuel Cell Power Systems," , DOE 2005 Annual Progress Report, 2005, VII. H. 8, 5 pages.

Lin et al. "Rapid, Solventless, Bulk Preparation of Metal Nanoparticle-Decorated Carbon Nanotubes," ACS Nano, 2009, vol. 3, No. 4, pp. 871-884.

Liu et al. "In situ coating multiwalled carbon nanotubes with CdS nanoparticles," Materials Chemistry and Physics, Jun. 2005, vol. 91, No. 2-3, pp. 365-369.

Ma et al. "Attachment of Gold Nanoparticles to Carbon Nanotubes," Chinese Chemical Letters, 2005, vol. 16, No. 2, pp. 265-268.

Macris et al. "Perfomance, Reliability, and Approaches Using a Low melt Alloy as a Thermal Interface Material," Enerdyne Solutions, Aug. 2004, 6 pages.

Maity et al. "Anisotropic Thermal Processing of Polymer Nanocomposites via the Photothermal Effect of Gold Nanorods," Particle & Particle Systems Characterization, Feb. 2013, vol. 30, No. 2, pp. 193-202.

Martin-Gallego et al. "Thermal conductivity of carbon nanotubes and graphene in epoxy nanofluids and nanocomposites," Nanoscale Research Letters, 2011, vol. 6, 7 pages.

Moskaitis et al. "High Performance Pyrolytic Graphite Composite Heat Spreaders," IMAPS Workshop on Thermal Management, Nov. 9-11, 2011, Palo Alto, CA, 26 pages.

Munari et al. "Metal Nanowire-Polymer Nanocomposite as Thermal Interface Material," 2009 Electronic Components and Technology Conference, Apr. 2009, pp. 448-452.

Navaladian et al. Thermal decomposition as route for silver nanoparticles, Nanoscale Research Letters, 2007, vol. 2, No. 1, pp. 44-48.

Panzer et al. "Thermal Properties of Metal-Coated Vertically Aligned Single-Wall Nanotube Arrays," Journal of Heat Transfer, May 2008, vol. 130, 9 pages.

Qu et al. "Substrate-Enhanced Electroless Deposition of Metal Nanoparticles on Carbon Nanotubes," Journal of the American Chemical Society, Aug. 2005, vol. 127, No. 31, pp. 10806-10807.

Razeeb et al. "Nanowire-Polymer Nanocomposites as Thermal Interface Material," Advances in Nanocomposites—Synthesis, Characterization and Industrial Applications, Chapter 30, Ed. Reddy, Apr. 2011, Chapter 30, 23 pages.

Ribeiro et al. "Thermal Properties of Ionic Liquids and Ionanofluids," Ionic Liquids: Theory, Properties, new Approaches, Chapter 2, Ed. Kokorin, 2011, 24 pages.

Samson et al. "Interface Material Selection and a Thermal Management Technique in Second-Generation Platforms Built on Intel® Centrino™ Mobile Technology," Intel® Technology Journal, Feb. 2005, vol. 9, No. 1, pp. 75-86.

Shahil et al. "Graphene-Based Nanocomposites as Highly Efficient Thermal Interface Materials," Nano Letters, Feb. 2012, vol. 12, No. 2, 18 pages.

Shan et al. "In Situ Coating Carbon Nanotubes with Wurtzite ZnS Nanocrystals," Journal of the American Ceramics Society, Feb. 2006, vol. 89, No. 2, pp. 759-762.

(56) References Cited

OTHER PUBLICATIONS

Song et al. "Polymer/carbon nanocomposites for enhanced thermal transport properties—carbon nanotubes versus graphene sheets as nanoscale fillers," Journal of Materials Chemistry, Sep. 2012, vol. 22, No. 33, pp. 17133-17139.
Timmerman et al. "Liquid Adhesive Selection and Performance in Electronics Applications," IMAPS Workshop on Thermal Management, Nov. 9-11, 2011, Palo Alto, CA, 40 pages.
Wajid et al. "Polymer-stabilized graphene dispersions at high concentrations in organic solvents for composite production," Carbon, Feb. 2012, vol. 50, No. 2, pp. 526-534.
Wu et al. "Metal sulfide coated multiwalled carbon nanotubes synthesized by an in situ method and their optical limiting properties," Nanotechnology, May 2009, vol. 20, No. 19, 11 pages.
Xu et al. "Carbon Nanotube Thermal Pastes for Improving Thermal Contacts," Journal of Electronic Materials, 2007, vol. 26, No. 9, pp. 1181-1187.
Yi et al. "Analyticla approximation of the percolation thereshold for overlapping ellipsoids of revolution," Proceedings of the Royal Society A, Aug. 2004, vol. 460, pp. 2353-2380.
Yamada et al. "Synthesis of Carbon Nanotube/Silver Nanocomposites by Ultrasonication," Materials Transactions, Sep. 2010, vol. 51, No. 10, pp. 1769-1772.
Yuan et al. "Improved properties of chemically modified graphene/ poly(methyl methacrylate) nanocomposites via a facile in-situ bulk polymerization," eXPRESS Polymer Letters, Oct. 2012, vol. 6, No. 10, pp. 847-858.
Yu et al. "Enhanced Thermal Conductivity in a Hybrid Graphite Nanoplatelet—Carbon Nanotube Filler for Epoxy Composites," Advanced Materials, Dec. 2008, vol. 20, No. 24, pp. 4740-4744.
Zhou et al. "Impriving the thermal conductivity of epoxy resin by the addition of a mixture of graphite nanoplatelets and silicon carbide microparticles," eXPRESS Polymer Letters, Jul. 2013, vol. 7, No. 7, pp. 585-594.
International Preliminary Report on Patentability for International (PCT) Patent Application No. PCT/US2012/033835, mailed Oct. 24, 2013 7 pages.
Himanshu et al., "Thermomechanical and Thermal Contact Characteristics of Bismuth Telluride Films Electrodeposited on Carbon Nanotube Arrays," Advanced Materials, 2009, vol. 21(42), pp. 4280-4280.
Extended European Search Report for European Application No. 12771794.0, mailed Jan. 5, 2015, 9 pages.
Official Action with English translation for Japanese Patent Application No. 2014-505408, dated Nov. 18, 2014, 9 pages.
International Search Report for International Patent Application No. PCT/US12/33835 mailed Sep. 7, 2012, 5 pages.
Written Opinion for International Patent Application No. PCT/US12/ 33835 mailed Sep. 7, 2012, 5 pages.
Author Unknown, "Percolation theory," Wikipedia, last modified on Feb. 10, 2012, [retrieved on Mar. 23, 2012]. Retrieved from: http:// en.wikipedia.org/wiki/Percolation_theory, 5 pages.
Boukhalfa, et al., "Atomic Layer Deposition of Vanadium Oxide on Carbon Nanotubes for High-Power Supercapacitor Electrodes—Accepted Manuscript," Energy & Environmental Science, first published on Feb. 21, 2012 at http:pubs.rsc.org, 12 pages.
El Kedim, et al., "Electrochemical behavior of nanocrystalline iron aluminide obtained by mechanically activated field pressure assisted synthesis," Materials Science and Engineering: A, 2004, vol. 369, Iss. 1-2, pp. 49-55.
Lin, et al., "Instantaneous Formation of Metal and Metal Oxide Nanoparticles on Carbon Nanotubes and Graphene via Solvent-Free Microwave Heating," ACS Applied Materials & Interfaces, 2011, vol. 3, Iss. 5, pp. 1652-1664.
English Translation of Notice of Allowance for Japan Patent Application No. 2014-505408, mailed Aug. 11, 2015 1 page.

\* cited by examiner

THERMAL INTERFACE MATERIALS AND SYSTEMS AND DEVICES CONTAINING THE SAME

CROSS REFERENCE TO RELATED APPLICATIONS

The present application claims the benefits of U.S. Provisional Application Ser. No. 61/475,502, filed Apr. 14, 2011, entitled "NANOCOMPOSITE THERMAL INTERFACE MATERIALS", which is incorporated herein by this reference in its entirety.

FIELD OF DISCLOSURE

This disclosure relates generally to thermally conductive polymer composites and particularly to thermal interface materials.

BACKGROUND

Thermal impact is commonly the rate limiting step in most applications that desire more power, higher functional density, and the capability to operate in increasingly harsh environments. The inability to dissipate heat contributes to thermal loading, which can limit functional range and lead to premature failure. Moreover, in some application heat dissipation is limited by space requirements. Thermal interface materials are an essential part of thermal management system as they help to ensure a continuous thermal conductive path between the heat source and heat sink/dissipater. Thermally conductive polymer-containing materials could simplify many designs. Therefore, a need exists to develop thermally conductive polymer-containing materials.

SUMMARY OF EMBODIMENTS

These and other needs are addressed by the various embodiments and configurations of the present disclosure.

Some embodiments include a composition having a conductive, percolated network of elongated, thermally conductive particles dispersed throughout a matrix material. The elongated, thermally conductive particles have an aspect ratio of at least about 25:1. Preferably, the aspect ratio is at least about 40:1. More preferably, the aspect ratio is at least about 50:1. In some configurations, the aspect ratio is at least about 100:1. The percolated network is commonly a three-dimensional network. The elongated, thermally conductive particles are preferably randomly oriented in the percolated network. Preferably, the conductive, percolated network has a plurality of thermally conductive pathways. The thermally conductive pathways have a low thermal resistance.

In accordance with some embodiments, the elongated, thermally conductive particles are selected from the group consisting essentially of metallic nano-wires, metallic alloy nano-wires, metallic carbon nano-tubes, coated-elongated particles, and combinations and/or mixtures thereof. The coated-elongated particles are selected from the group consisting essentially of coated nano-tubes, coated graphene sheets, coated-elongated graphite particles, coated-elongated boron nitride, coated-elongated aluminum nitride, coated-elongated silicon nitride, coated-elongated silicon carbide, coated-elongated gallium nitride, coated-elongated diamond, coated-elongated alumina and mixtures thereof.

Preferably, the matrix material comprises at least than about 80 volume % of the composition. More preferably, the matrix material comprises from about 90 to about 95 volume % of the composition. The matrix material is selected from the group consisting essentially of organic materials, organic polymeric materials, inorganic materials, inorganic polymeric materials, ceramics, organometallic materials, polymeric organometallic materials and combinations thereof. The organic polymeric material is selected from the group consisting essentially of homo-polymers, block co-polymers, polymeric mixtures and blends, polymeric alloys, and copolymers of polyolefins, polystyrenes, polyvinyls, polyacrylics, polyhalo-olefins, polydienes, polyoxides/ethers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polyketones/thioketones, polysulfones/sulfoxides/sulfonates/sulfonamides, polyphenylenes, and mixtures thereof. The inorganic polymeric material is selected from the group consisting essentially of polysilanes, polygermanes, polystannanes, polyborazylenes, polyphosphazenes, polysiloxanes, polydimethsiloxanes, polymethylhydrosiloxanes, polydiphenysiloxanes, polysilazanes, perhydridopolysilazanes, poly(dichlorophosphazene)s, poly(sulfur nitride)s, polythiazyls, and polysulfides, or a mixture thereof. In accordance with some embodiments, the inorganic polymeric materials can be selected from the group consisting essentially of portland cement, portland cement and silicon dioxide, glasses, vycor glasses, borosilicate glases, polyanionic glasses, poly (carbosilane)s, and mixtures thereof. The organometallic compounds and organometallic polymeric materials comprise materials containing the main group elements of silicon and germanium, transition metals (having atomic numbers 22-30, 40-48 and 72-80), rare earth elements (having atomic numbers 21, 39, and 57-71), and elements having atomic numbers of 1, 5-9, 15, 17, 35, 53 and 85.

Non-limiting examples of coated-elongated particles are particles coated with a coating material containing one or more of Ge, Si, Ga, As, In, Sb, Bi, Te, Cd, S, Cd, Se, Hg, P, In, Pb, Te, Hg, Te, Sn, Pb, In, Cu, Ag, Au, binary combinations in any atomic ratio thereof, tertiary combinations in any atomic ratio thereof, and other combinations thereof. In some configurations, the coating material is one of Ge, Si, Sn, Pb, In, Cu, Ag, Au, or a mixture thereof. In some configurations, the coating material is binary mixture one of GaAs, InSb, BiTe, CdS, CdSe, HgSe, GaP, InP, PbTe, and HgTe. The coated-elongated particles preferably have a continuous coating. In some configurations, the coated-elongated particles have a coating thickness that does not substantially decrease the elongated particle aspect ratio. Preferably, the nano-particles are coated with a coating having a short electron-phonon coupling length. Electron-phonon coupling length generally refers to the characteristic length of a region near a thermal boundary/interface where the electrons and phonons exist in their non-equilibrium states. It denotes the distance over which a phonon has to travel before it comes back to equilibrium after thermal energy transfer to a charge carrier (electron). A short electron-phonon coupling length substantially provides for thermal energy transfer.

Preferably, the composition contains no more than about 20 volume % of coated-elongated particles, more preferably no more than about 15% of coated-elongated particles. Even more preferably, the composition contains no more than about 12 volume % of coated-elongated particles. In some embodiments, the composition contains no more than about 10 volume % of coated-elongated particles. In accordance with some embodiments, the composition contains no more than about 7 volume % of coated-elongated particles, preferably no more than about 5 volume % coated-elongated particles.

In some embodiments, the coated-elongated particles have an average diameter and/or thickness from about 0.1 to about 500 nanometers, preferably from about 0.5 to about 450 nanometers. More preferably, the coated-elongated particles have an average diameter and/or thickness from about 0.6 to about 400 nanometers.

Preferably, the coated-elongated particles have an average length from about 10 to about 1,000 microns. More preferably, the coated-elongated particles have an average length from about 10 to about 500 microns.

In accordance with some embodiments, the percolated network is a three-dimensional network. Preferably, the percolated network has a plurality of thermally conductive pathways. The thermally conductive pathways have a low resistance, preferably a low resistance to the transmission of thermal energy. More preferably, the low resistance pathways have low thermal boundary resistance.

The percolated network is preferably thermally conductive. The percolated network can preferably have a thermal conductivity of at least about 2 $Wm^{-1}K^{-1}$, more preferably at least about 5 $Wm^{-1}K^{-1}$, even more preferably at least about 50 $Wm^{-1}K^{-1}$, yet more preferably at least about 100 $Wm^{-1}K^{-1}$, yet even more preferably at least about 500 $Wm^{-1}K^{-1}$, or still yet even more preferably at least about 1000 $Wm^{-1}K^{-1}$. The percolated network is one or both of a charge and phonon conductive network. In accordance with some embodiments, the composition comprises a thermal interface material having a thermal conductivity of at least about 2 $Wm^{-1}K^{-1}$, more preferably at least about 5 $Wm^{-1}K^{-1}$, even more preferably at least about 100 $Wm^{-1}K^{-1}$, yet even more preferably at least about 500 $Wm^{-1}K^{-1}$, or still yet even more preferably at least about 1000 $Wm^{-1}K^{-1}$.

In accordance with some embodiments, the nano-particles are carbon nano-tubes. The term carbon nano-tubes generally refers to one or more of single-walled carbon nano-tubes, double-walled carbon nano-tubes, few-walled carbon nano-tubes, multi-walled carbon nano-tubes or mixture of single-walled, double-walled, few-walled, and multi-walled carbon nano-tubes. Preferably, the carbon nano-tubes comprise no more than about 20 volume % of the composition, more preferably the carbon nano-tubes comprise no more than about 15% of the composition. Even more preferably, the composition contains no more than about 12 volume % of carbon nano-tubes. In some embodiments, the composition contains no more than about 10 volume % of carbon nano-tubes. In accordance with some embodiments, the composition contains no more than about 7 volume % of carbon nano-tubes, preferably no more than about 5 volume % carbon nano-tubes. The carbon nano-tubes have an aspect ratio greater than about 25:1. Preferably, the aspect ratio of the carbon nano-tubes is greater than about 40:1. More preferably, the aspect ratio of the carbon nano-tubes is greater than about 50:1. In some configurations, the aspect ratio of the carbon nano-tubes is greater than 100:1. Moreover, the low resistance pathways are preferably formed between two or more, more preferably between three or more, non-aligned, randomly oriented coated carbon nano-tubes.

Some configurations include carbon nano-tubes coated with a coating having a short electron-phonon coupling length. The coated-elongated particles are coated with a coating material containing one or more of Ge, Si, Ga, As, In, Sb, Bi, Te, Cd, S, Cd, Se, Hg, P, In, Pb, Te, Hg, Te, Sn, Pb, In, Cu, Ag, Au, binary combinations in any atomic ratio thereof, tertiary combinations in any atomic ratio thereof, and other combinations thereof. In some configurations, the coating material is one of Ge, Si, Sn, Pb, In, Cu, Ag, Au, or a mixture thereof. In some configurations, the coating material is binary mixture one of GaAs, InSb, BiTe, CdS, CdSe, HgSe, GaP, InP, PbTe, and HgTe. The carbon nano-tubes are preferably at least one of substantially uniformly, non-uniformly, continuously, and discontinuously coated with the short electron-phonon coupling length coating. In some embodiments the coating may comprise the matrix material; that is, the coating is the matrix material having the elongated, thermally conductive particles substantially disturbed through in the form of a percolated network.

In accordance with some embodiments, the nano-particles are graphene sheets. The graphene sheets have an aspect ratio greater than about 25:1. Preferably, the aspect ratio of the graphene sheets is greater than about 40:1. More preferably, the aspect ratio of the graphene sheets is greater than about 50:1. In some configurations, the aspect ratio of the graphene sheets is greater than 100:1. In some embodiments, the graphene sheets are substantially planar. Preferably, the composition contains are no more than about 20 volume % of the graphene sheets, more preferably are no more than about 15% of the graphene sheets. Even more preferably, the composition contains no more than about 12 volume % of the graphene sheets. In some embodiments, the composition contains no more than about 10 volume % of the graphene sheets. In accordance with some embodiments, the composition contains no more than about 7 volume % of the graphene sheets, preferably no more than about 5 volume % of the graphene sheets. Substantially non-aligned, randomly oriented coated graphene sheets typically form the conductive, percolated network. Moreover, the low resistance pathways are preferably formed between two or more, more preferably between three or more, non-aligned, randomly orientated coated graphene sheets. Some configurations include graphene sheets coated with a coating having a short electron-phonon coupling length. The coated-elongated particles are coated with coating material contain one or more of Ge, Si, Ga, As, In, Sb, Bi, Te, Cd, S, Cd, Se, Hg, P, In, Pb, Te, Hg, Te, Sn, Pb, In, Cu, Ag, Au, binary combinations in any atomic ratio thereof, tertiary combinations in any atomic ratio thereof and other combinations thereof. In some configurations, the coating material is one of Ge, Si, Sn, Pb, In, Cu, Ag, Au, or a mixture thereof. In some configurations, the coating material is binary mixture one of GaAs, InSb, BiTe, CdS, CdSe, HgSe, GaP, InP, PbTe, and HgTe. The graphene sheets are preferably at least one of substantially uniformly, non-uniformly, continuously, and discontinuously coated with the short electron-phonon coupling length coating.

Some embodiment include a composition having a conductive, percolated network having elongated, thermally conductive particles distributed throughout a short electron-phonon coupling length material. Preferably, the elongated, thermally conductive particles are no more than about 20 volume % of the composition. Moreover, the elongated, thermally conductive particles preferably have an average aspect ratio of at least about 25:1. The short electron-phonon coupling length material preferably contains one or more of Ge, Si, Ga, As, In, Sb, Bi, Te, Cd, S, Cd, Se, Hg, P, In, Pb, Te, Hg, Te, Sn, Pb, In, Cu, Ag, Au, binary combinations in any atomic ratio thereof, tertiary combinations in any atomic ratio thereof, and other combinations thereof.

These and other advantages will be apparent from the disclosure and embodiments, aspects and configurations contained herein.

As used herein, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

As used herein, "at least one", "one or more", and "and/or" are open-ended expressions that are both conjunctive and disjunctive in operation. For example, each of the expressions "at least one of A, B, and C", "at least one of A, B, or C", "one or more of A, B, and C", "one or more of A, B, or C" and "A, B, and/or C" means A alone, B alone, C alone, A and B together, A and C together, B and C together, or A, B and C together.

The preceding is a simplified summary of the disclosure to provide an understanding of some aspects of various embodiments of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples.

Further features and advantages will become apparent from the following, more detailed, description of the various embodiments, aspects and configurations of the disclosure, as illustrated by the drawings referenced below.

DETAILED DESCRIPTION OF EMBODIMENTS

Figure 1:
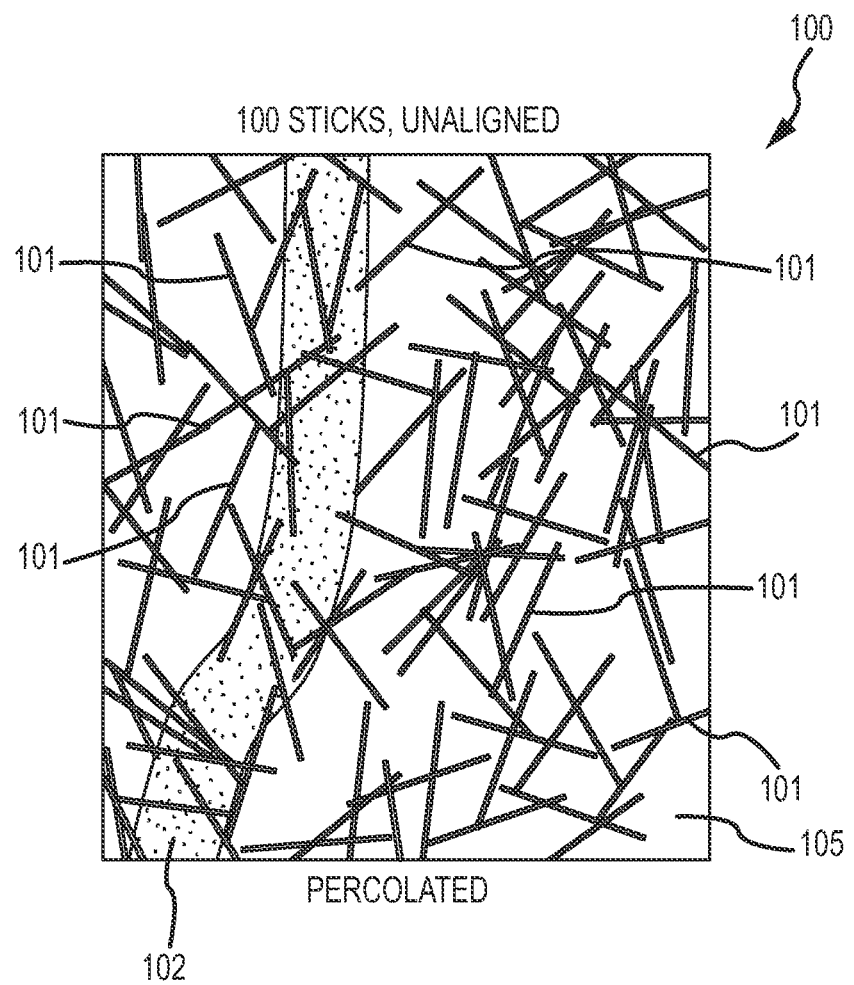
FIG. 1 depicts a thermal interface material in accordance with some embodiments.

FIG. 1 depicts a thermal interface material 100 in accordance with some embodiments. The thermal interface material 100 comprises a matrix material 105 and a percolated network 102 of elongated, thermally conductive particles 101. In accordance with some embodiments, the thermal interface material 100 comprises a composite material comprising the percolated network 102 of elongated, thermally conductive particles 101 distributed in the matrix material 105. In some configurations, the thermal interface material 100 consists essentially of a matrix material 105 and a percolated network 102 of elongated, thermally conductive particles 101.

The elongated thermally conductive particles 101 can have any elongated shape. Preferably, the elongated particles 101 have a greater particle length than particle thickness and/or diameter. More preferably, the particles 101 have an aspect ratio of particle length to particle thickness and/or diameter, where appropriate. Typically, the aspect ratio is greater that about 20, more typically greater than about 25, even more typically greater than about 40, yet even more typically greater than about 50, still yet even more typically greater than about 60, or yet still even more typically greater than about 100.

The elongated, thermally conductive particles 101 preferably have an average diameter and/or thickness and an average length. The average diameter and/or thickness is commonly from about 0.1 to about 500 nanometers, more commonly from about 0.5 to about 450 nanometers. In accordance with some embodiments, the average diameter and/or thickness may be from about 0.6 to about 400 nanometers. The average length for the elongated, thermally conductive particles 101 is typically from about 10 to about 1,000 microns, more typically from about 10 to about 500 microns.

Figure 2:
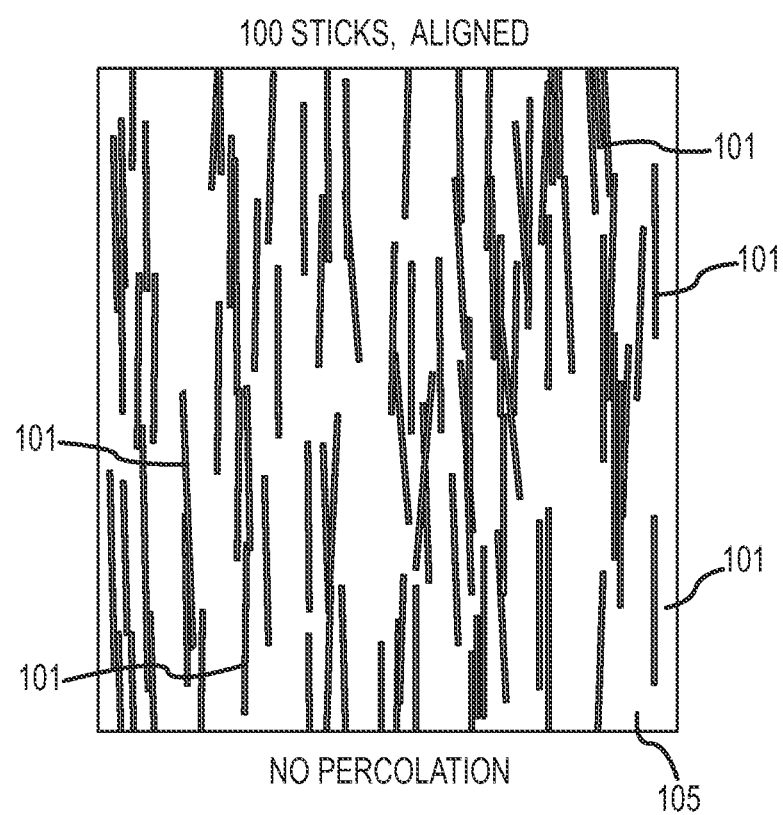
FIG. 2 depicts an anisotropic distribution in accordance with some embodiments.
Figure 3:
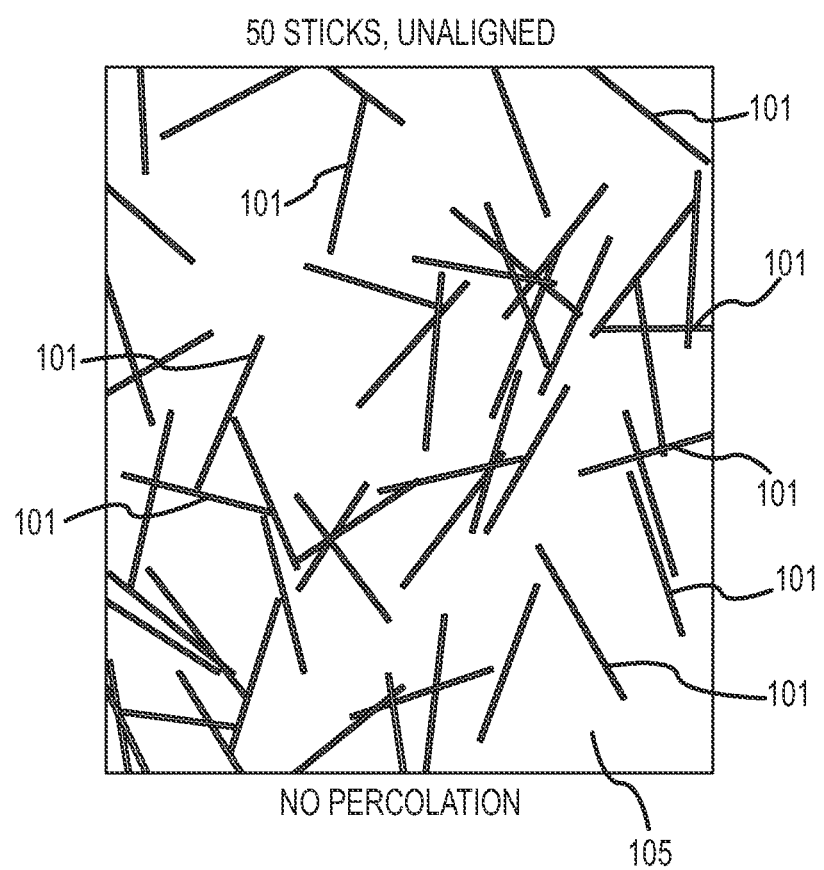
FIG. 3 depicts isotropic distributions in accordance with some embodiments.
Figure 4A:
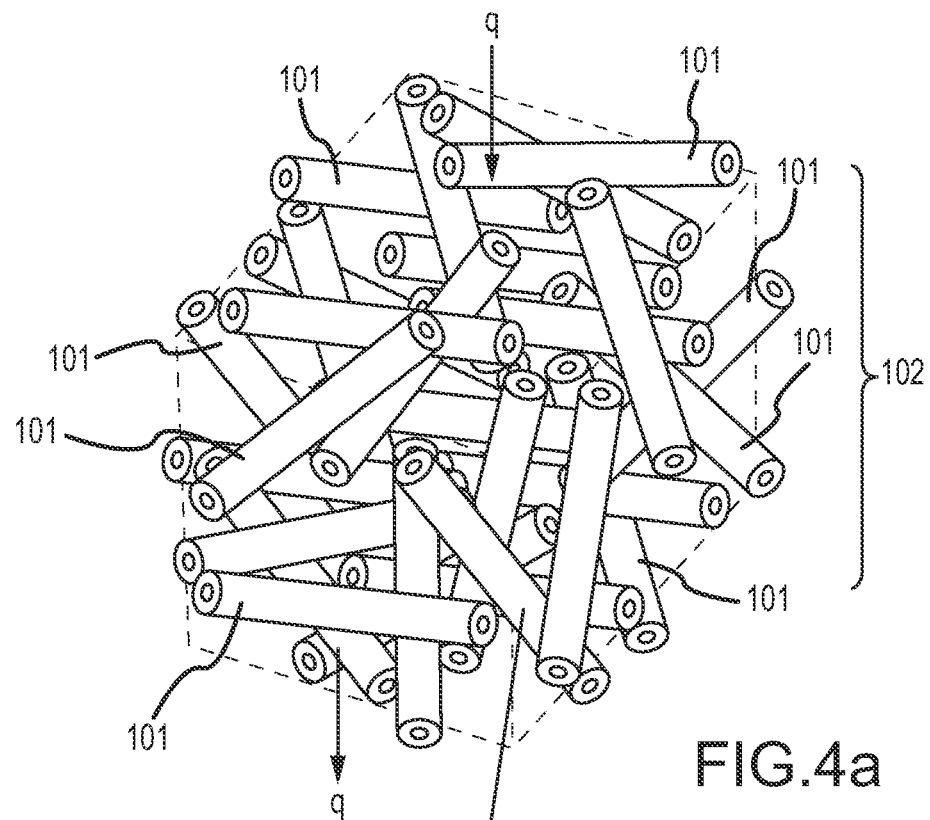
FIGS. 4a and 4b depicts three-dimensional random array of an example high aspect ratio material forming a percolated network (a) and the point connectivity between materials (b)
Figure 4B:
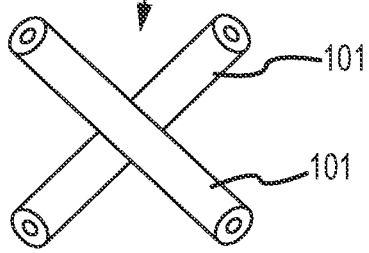

Preferably, the elongated, thermally conductive particles 101 are randomly distributed in an isotropic manner throughout the matrix material 105. That is, the elongated, thermally conductive particles 101 are dispersed in the matrix material 105 in an isotropic manner (FIG. 2 depicts an anisotropic distribution and FIGS. 1 and 3 depict isotropic distributions). The percolated network 102 preferably comprises a three-dimensional network of the elongated, thermally conductive particles 101 dispersed throughout the matrix material 105. The elongated, thermally conductive particles 101 are preferably at a sufficient concentration to form one or more pathways (FIGS. 4a and 4b) through the matrix material 105. The one or more pathways may traverse thermal interface material 100 to form a plurality of thermally conductive pathways through the thermal interface material 100. Preferably, the plurality of thermally conductive pathways interconnects first and second surfaces of the thermal interface material 100, more preferably the first and second surfaces are in an opposing relationship. The plurality of thermally conductive pathways is preferably in the form from a discontinuous assembly of the elongated, thermally conductive particles 101. Preferably the concentration and geometric arrangement of particles form a plurality of thermally conductive pathways that exceeds the percolation threshold.

A percolated network 102 is formed by the substantially random distribution of the elongated, thermally conductive particles 101 throughout the matrix material 105. The percolated network 102 forms a plurality of thermally conductive pathways through the matrix material 105. At least most, if not all, of the thermal energy conducted through the thermal interface material 100 is transmitted through the percolated network.

The elongated, thermally conductive particles 101 can be one or both of charge and phonon carriers. That is, charges (such as, electrons and/or holes) and phonons can be carried by an elongated, thermally conductive particle. Furthermore, the percolated network 102 is a charge and phonon carrier network.

The elongated, thermally conductive particles 101 comprise one of metallic nano-wires, metallic alloy nano-wires, coated-elongated particles, metallic carbon nano-tubes, coated carbon nano-tubes, coated graphene sheets, elongated graphite particles, coated elongated graphite particles, or a mixture thereof. Preferably, the elongated thermally conductive particles 101 are one of metallic nano-wires, metallic alloy nano-wires, metallic carbon nano-tubes, coated carbon nano-tubes, coated graphene sheets, elongated graphite particles, coated elongated graphite particles, or a mixture thereof. Metallic carbon nano-tubes are generally characterized by an 'armchair' chirality, whereby the indices 'n' and 'm' are used to describe the geometrical configuration in which graphene sheets are wrapped are equal (n=m). 'n' and 'm' denote the number of unit vectors along two directions of the graphene honeycomb crystal lattice. Thermal energy transfer in metallic CNTs occurs primarily via charge carriers or electrons.

Commonly, the elongated, thermally conductive particles 101 comprise no more than about 20 volume % of the thermal interface material 100, more commonly no more than about 15 volume %, even more commonly no more than about 12 volume %, or yet even more commonly no more than about 10 volume % of the thermal interface material 100. In accordance with some embodiments, the composition contains no more than about 7 volume % of the elongated thermally conductive particles 101, preferably no more than about 5 volume % of the elongated thermally conductive particles 101. In some configurations, the elongated, thermally conductive particles 101 comprise coated-elongated particles, the coated-elongated particles 12 volume %, yet even more typically no more than about 10 volume % of the thermal typically comprise no more than about 20 volume % of the thermal interface material 100, more typically no more than about 15 volume %, even more typically no more than about interface material 100. In accordance with some embodiments, the coated-elongated particles preferably comprise no more than about 7 volume % of the thermal interface material 100, more preferably no more than about 5 volume % of the thermal interface material 100.

Preferably, the matrix material comprises at least about 80 volume % of the composition. More preferably, the matrix material comprises from about 90 to about 95 volume % of the composition.

The percolated network 102 pathways are preferably low resistance pathways. More preferably, the low resistance pathways are low resistance thermal pathways. Moreover, the low resistance pathways are preferably formed between two or more, more preferably between three or more elongated, thermally conductive particles 101. In some configurations, the percolated network 102 commonly has a thermal conductivity of at least about 2 $Wm^{-1}K^{-1}$, more commonly a thermally conductivity of at least about 5 even more commonly a thermally conductivity of at least about 100 $Wm^{-1}K^{-1}$, yet even more commonly a thermally conductivity of at least about 500 $Wm^{-1}K^{-1}$, or still yet even more commonly a thermally conductivity of at least about 1000 $Wm^{-1}K^{-1}$.

Commonly, at least about 100% of the thermal energy is conducted through the thermal interface material 100 is transmitted through the percolated network 102 of elongated, thermally conductive particles 101, more commonly at least about 99% of the thermal energy, even more commonly at least about 95% of the thermal energy, yet even more commonly at least about 90% of the thermal energy, still yet even more commonly at least about 85% of the thermal energy, still yet even more commonly at least about 80% of the thermal energy, still yet even more commonly at least about 75% of the thermal energy, still yet even more commonly at least about 70% of the thermal energy, still yet even more commonly at least about 65% of the thermal energy, still yet even more commonly at least about 60% of the thermal energy, still yet even more commonly at least about 55% of the thermal energy, or yet still even more commonly at least about 50% of the thermal energy conducted through the thermal interface material 100 is transmitted through the percolated network 102 of elongated, thermally conductive particles 101.

Typically, the matrix material 105 has thermal conductivity of no more than $1\times10^{-1}$ times that of the elongated, thermally conductive particles 101, more typically no more than about 0.01 times that of the elongated, thermally conductive particles 101, even more commonly no more than about $1\times10^{-2}$ times that of the elongated, thermally conductive particles 101, yet even more commonly no more than about $1\times10^{-3}$ times that of the elongated, thermally conductive particles 101, still yet even more commonly no more than about more commonly no more than about $1\times10^{-4}$ times that of the elongated, thermally conductive particles 101 times that of the elongated, thermally conductive particles 101, still yet even more commonly no more than about $1\times10^{-5}$ times that of the elongated, thermally conductive particles 101, still yet even more commonly no more than about $1\times10^{-6}$ times that of the elongated, thermally conductive particles 101, or yet still more commonly no more than about $1\times10^{-7}$ times that of the elongated, thermally conductive particles 101.

In accordance with some embodiments, the percolated network 102 and the matrix material 105 are the thermal conductive pathways through the thermal interface material 100. That is, in accordance with some embodiments, the thermal interface material 100 is substantially devoid of materials other than the elongated, thermally conductive materials 101, with or without a coating, and the matrix material 105 contributing to the thermal conductivity of thermal interface material 100.

While not wanting to be bound by theory, it is believed that the plurality of pathways in the percolated network 102 provide thermal energy transfer by charge carriers with the ability to overcome interfacial resistance within the pathways. It is further believed that the electrons (or holes) may hop or tunnel at junctions between the elongated, thermally conductive particles 101 within the percolated network In accordance with some embodiments, the elongated, thermally conductive particles 101 are substantially charge carriers. The charge carriers are one or both of electrons and holes. Typically, suitable charge carries comprise one or more of metallic nano-wires, metallic carbon nano-tubes, and mixtures thereof.

The metallic nano-wires can comprise any metalloid or metal material. The metal may comprise any metal or metalloid-containing material comprising a metal or metalloid having an atomic number selected from the group consisting of atomic numbers 4, 5; 12-14, 20-32, 34, 38-42, 44-52, 56-60, 62-79, 81-84 and combinations and mixtures thereof. Preferably, the nano-wire comprises a metalloid and/or metalloid-containing material containing a metalloid having an atomic number selected from the group consisting of atomic numbers Ag, Au, Cu, In, Pb, Ni, Sn and combinations thereof. Preferably, the nano-wire comprises one metal and/or metal-containing material containing a metal having an atomic number selected from the group consisting of atomic numbers Ag, Au, Cu, In, Pb, Ni, Sn and combinations thereof.

Figure 5:
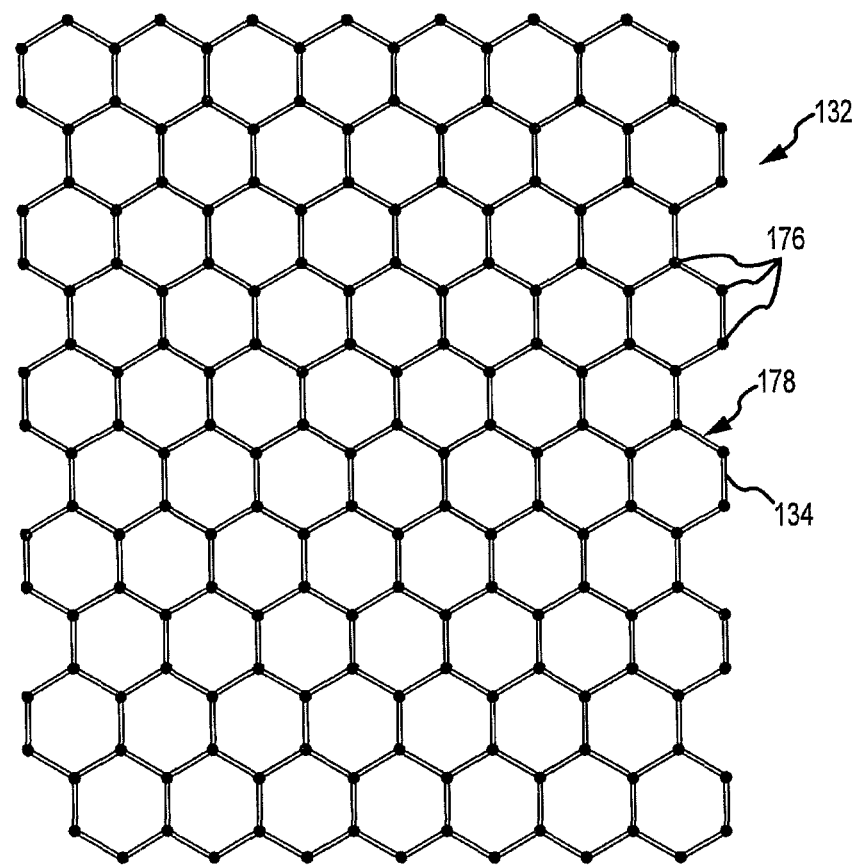
FIG. 5 depicts a graphene structure.
Figure 6A:
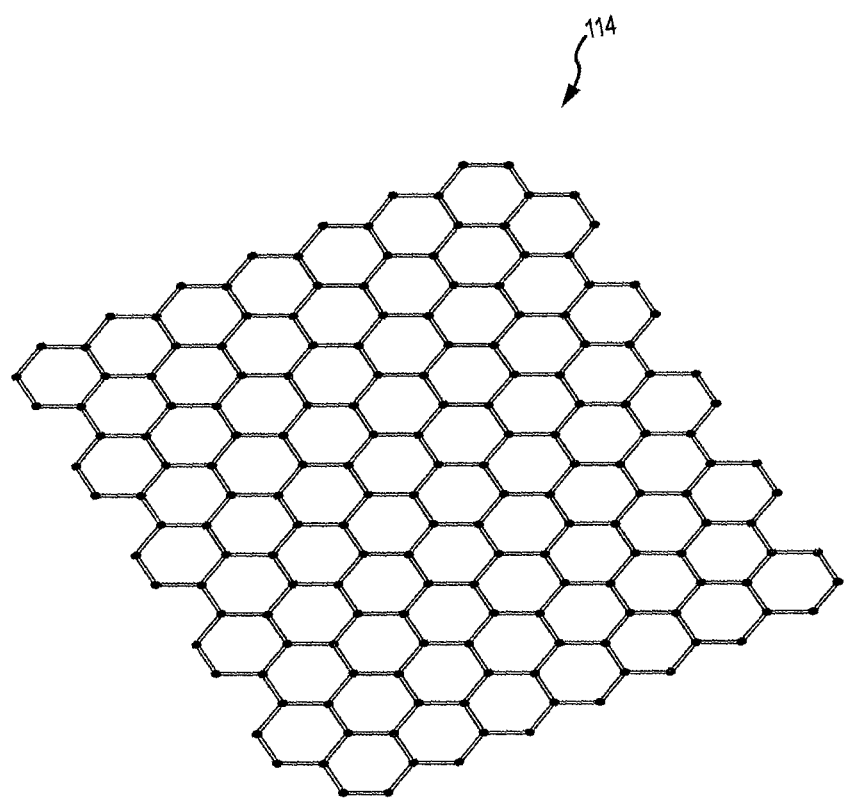
FIGS. 6A-C depicts a graphene structure in accordance with some embodiments.
Figure 6B:
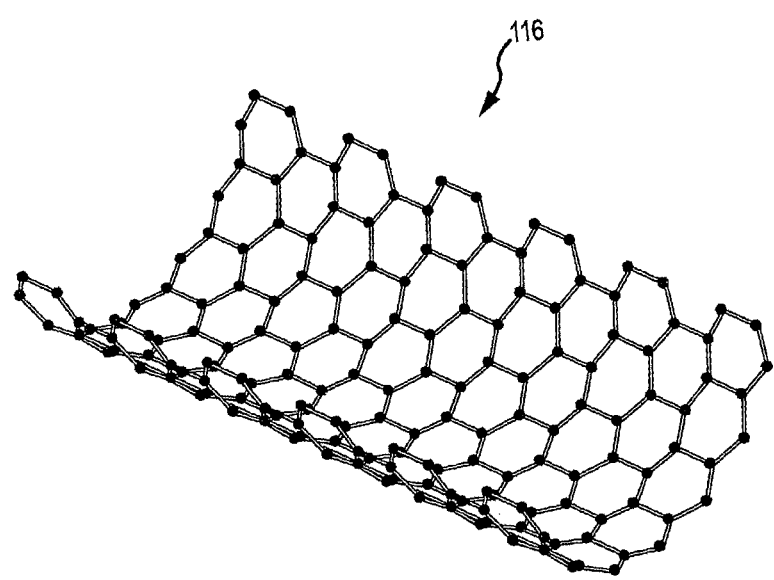
Figure 6C:
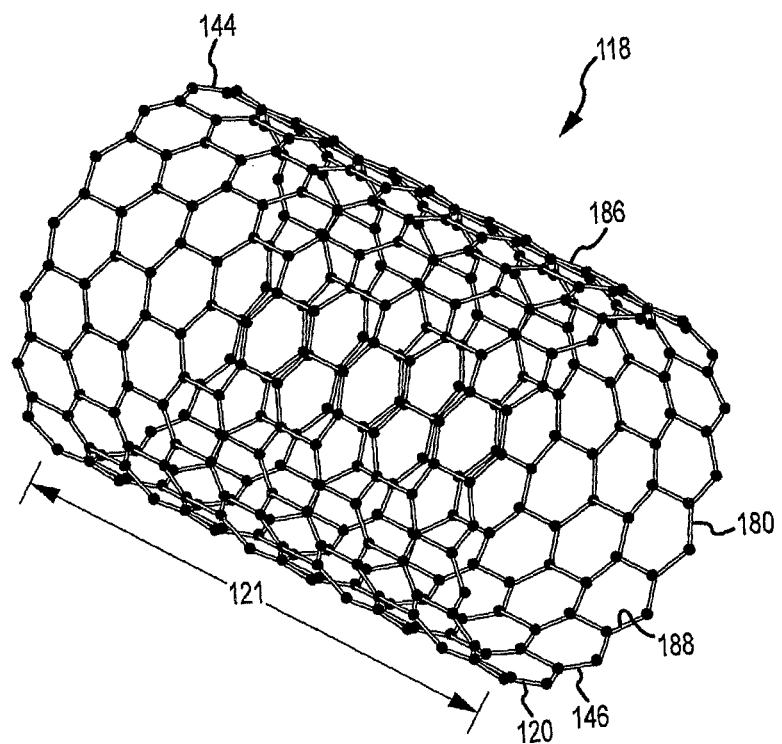

Graphene sheets, carbon nano-tubes and graphite comprise a graphene structure. FIG. 5 depicts a graphene structure 134. Typically, the graphene structure 134 may be one of: a planar-shaped graphene sheet 114 (FIG. 6A); a non-planar shaped graphene nano-ribbon 116 (FIG. 6B); a cylindrically-shaped structure, also known within the art and referred to herein as a carbon nano-tube 118 (FIG. 6C); and any geometrical arrangement of the graphene structure (such as, those known within the art as bucky balls or buckminsterfullerenes).

The graphene structure comprises a plurality of $sp^2$-hybrized carbon atoms 176 interconnected to form a one-atom thick sheet 178. The $sp^2$-hybrized carbon atoms 176 are interconnected in groups. In one embodiment, at least most of the $sp^2$-hybrized carbon atoms in the graphene structure are interconnected in groups of six carbon atoms, with each group of six carbon atoms forming a substantially flat, regular hexagon 132.

As noted, a carbon nano-tube 118 can be thought of as a graphene structure 134 rolled up into a tubular or cylindrical form. A carbon nano-tube 118 can be a single walled nano-tube, double-walled nano-tube, few-walled nano-tube; or multi-walled nano-tube.

Figure 7:
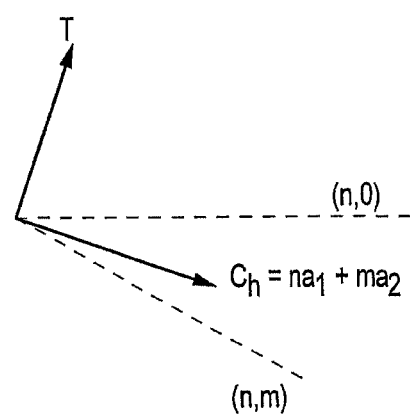
FIG. 7 depicts the carbon nano-tube vector (n, m)

The single-walled carbon nano-tube comprises a single graphene structure 134 configured as a nano-tube. Structurally, the single-walled carbon nano-tube comprises a seamless hollow tube having a one-atom thick graphene wall 180 and a chiral vector 124 (FIG. 7). In an embodiment, the single-walled carbon nano-tube further comprises a hemispherical graphene cap comprising from about 3 to about 10 pentagons at one or more ends of the single-walled carbon nano-tube.

Figure 8:
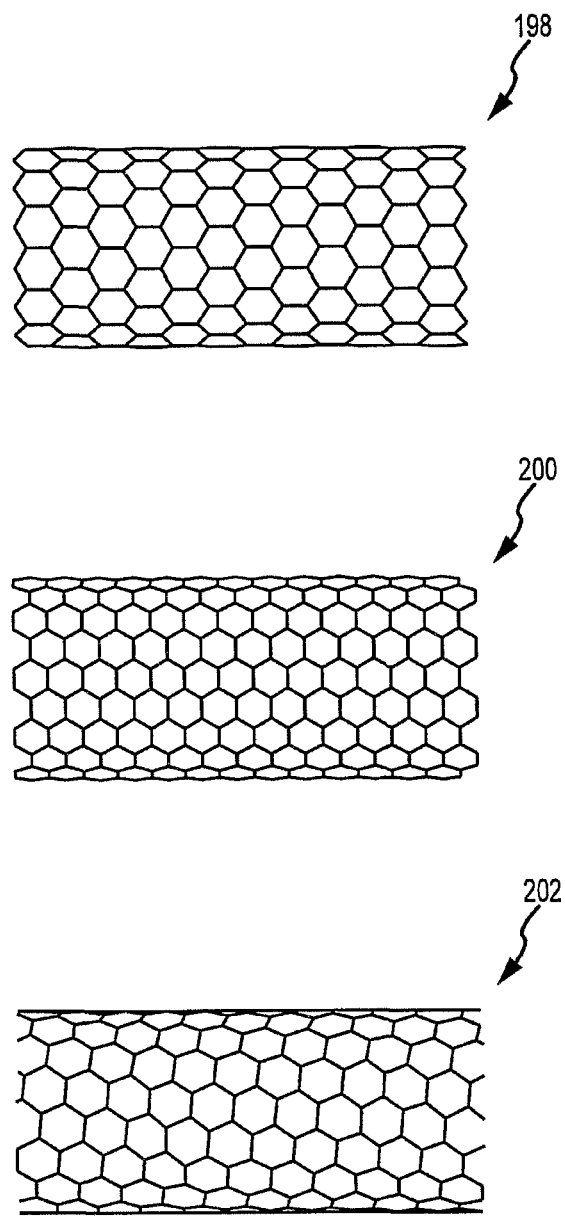
FIG. 8 depicts single-wall carbon nano-tubes having chiral vectors (0,10), (7,10) and (10,10) in accordance with some embodiments.

The chiral vector 124 comprises a pair of indices (n,m), which denote unit vectors along two directions of the crystal lattice of the graphene structure. While not wanting to be bound by any theory, the chiral vector 124 affects the single-walled carbon nano-tube electrical properties. In some configurations, the single-walled carbon nano-tubes have vectors 124 where one of the following is true: a) n=m; and b) (n−m)/3 is an integer. FIG. 8 depicts single-wall carbon nano-tubes 118 having chiral vectors of (0,10), (7,10) and (10, 10), respectively, denoted in FIG. 8 as carbon nano-tubes 198, 200, and 202.

The carbon nano-tubes have a diameter ("ID") 120, length 122 and chiral vector 124. The carbon nano-tube diameter ("ID") 120 ranges from about 1 Å to about 200 nanometers.

Figure 9A:
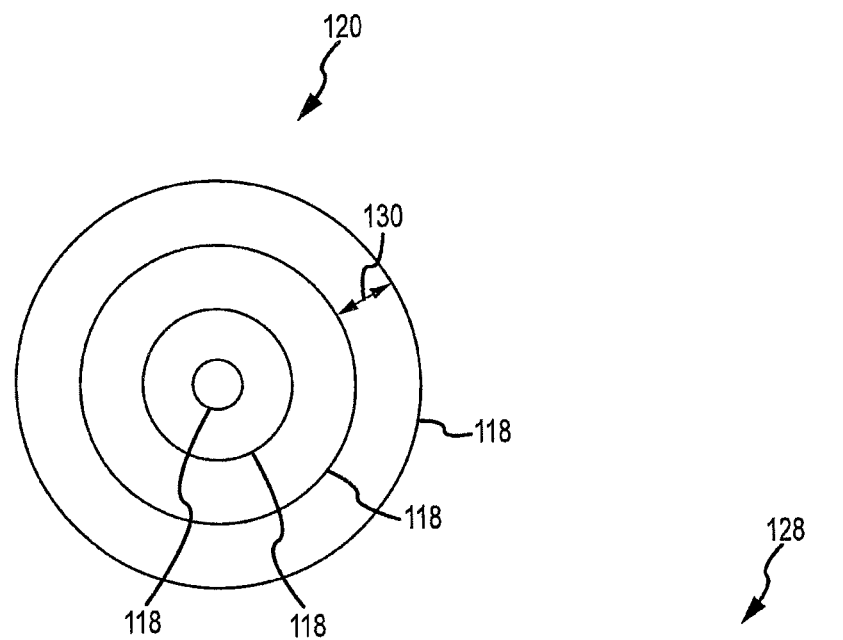
FIGS. 9A-B depicts depict cross-sections of multi-walled carbon nao-tubes according to an embodiment of some embodiments.
Figure 9B:
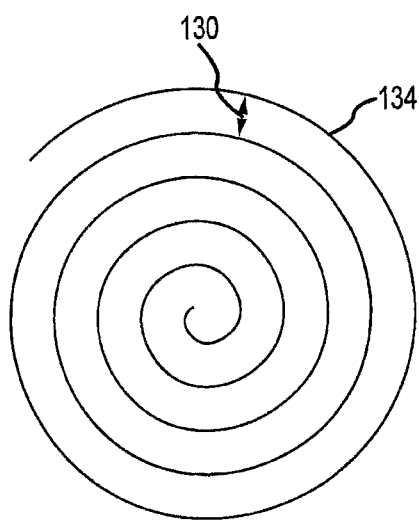

The multi-walled carbon nano-tube comprises one or more graphene nano-ribbons 134 rolled up around a single-walled carbon nano-tube core, the one or more graphene nano-ribbons 134 forming multiple graphene walls 180 (FIGS. 9A and 9B). While not wanting to be bound by any theory, the multi-walled carbon nano-tube can comprise one of: a) a series of seamless single-walled carbon nano-tube tubes arranged as concentric cylinders one inside of another (126) or b) a single graphene nano-ribbon 134 rolled spirally around itself (128). The interlayer distance 130 between graphene layers ranges from about 1 Å to about 10 Å, preferably from about 2 Å to about 4 Å.

Graphite typically comprises graphene sheets stacked one on top of another. The graphene sheets can be arranged to form a crystalline or amorphous graphite structures.

Carbon nano-tubes generally comprise one of metallic carbon nano-tubes, semi-conductor carbon nano-tubes, or a mixture of metallic and semi-conductor carbon nano-tubes. "Metallic carbon nano-tubes" generally refers to carbon nano-tubes having one or more of a thermal conductivity of more than about 500 $Wm^{-1}k^{-1}$. "Semi-conductor carbon nano-tubes" generally refers to carbon nano-tubes are carbon nano-tubes other than metallic carbon nano-tubes. Unless indicated otherwise, "carbon nano-tubes" generally refers to a mixture of mixture of metallic and semi-conductor carbon nano-tubes. More typically, at least most of the carbon nano-tubes comprising a mixture of metallic and semi-conductor carbon nano-tubes are semi-conductor carbon nano-tubes, even more typically at least about 60% are semi-conductor carbon nano-tubes, yet even more typically at least about 70% are semi-conductor carbon nano-tubes, still yet even more typically at least about 80% are semi-conductor carbon nano-tubes, or yet still even more typically at least about 90% are semi-conductor carbon nano-tubes. As described above, the carbon nano-tubes can be single-walled or multi-walled carbon nano-tubes. In some configurations, the carbon nano-tubes are single-walled carbon nano-tubes, double-walled carbon nano-tubes, few-walled carbon nano-tubes, multi-walled carbon nano-tubes or a mixture of single-walled, double-walled, few-walled and multi-walled carbon nano-tubes.

In accordance with some embodiments, the elongated, thermally conductive articles may comprise coated-elongated particles. The coated-elongated particles may comprise coated nano-tubes, coated graphene sheets, coated elongated graphite particles, or a mixture thereof. The coated-elongated particles preferably comprise a coating having a substantially short electron-phonon coupling length. Commonly, the coated-elongated particles comprise a coating having an electron-phonon coupling length of no more than about $10^{-2}$ cm, more commonly an electron-phonon coupling length of no more than about $10^{-4}$ cm, even more commonly an electron-phonon coupling length of less than about $10^{-6}$ cm, or even more commonly an electron-phonon coupling length of less than about $10^{-8}$ cm. Non-limiting examples of suitable coating materials are coatings containing one or more of Ge, Si, Ga, As, In, Sb, Bi, Te, Cd, S, Cd, Se, Hg, P, In, Pb, Te, Hg, Te, Sn, Pb, In, Cu, Ag, Au, binary combinations in any atomic ratio thereof, tertiary combinations in any atomic ratio thereof and other combinations thereof. In some configurations, the coating material is one of Ge, Si, Sn, Pb, In, Cu, Ag, Au, or a mixture thereof. In some configurations, the coating material is binary mixture one of GaAs, InSb, BiTe, CdS, CdSe, HgSe, GaP, InP, PbTe, and HgTe.

In some embodiments, the coated-elongated particles have an average coating thickness of at least about 0.2 nm, preferably of at least 0.1 nm. Preferably, the elongated particle average aspect ratio with and without the coating is substantially about 1 times that of the uncoated elongated particles. The aspect ratio of the coated-elongated particles are commonly on average at least about 0.95 times that of the uncoated elongated particles, more commonly at least about 0.90 times that of the uncoated elongated particles, even more commonly at least about 0.85 times that of the uncoated elongated particles, yet even more commonly at least about 0.80 times that of the uncoated elongated particles, or still yet even more commonly at least about 0.75 times that of the uncoated elongated particles.

The matrix material 105 can be substantially any material. The matrix can be an organic material, organic polymeric material, inorganic material, inorganic polymeric material, ceramic, organometallic material, polymeric organometallic material or a combination thereof. The organic polymeric material may comprise a homo-polymer, block co-polymer, polymeric mixture, polymeric alloy, copolymer or a combination thereof. Moreover, the organic polymeric material may comprise one or more of polyolefins, polystyrenes, polyvinyls, polyacrylics, polyhalo-olefins, polydienes, polyoxides/esthers/acetals, polysulfides, polyesters/thioesters, polyamides/thioamides, polyurethanes/thiourethanes, polyureas/thioureas, polyimides/thioimides, polyanhydrides/thianhydrides, polycarbonates/thiocarbonates, polyimines, polysiloxanes/silanes, polyphosphazenes, polyketones/thioketones, polysulfones/sulfoxides/sulfonates/sulfoamides, polyphylenes, and mixtures thereof. The inorganic polymeric material is selected from the group consisting essentially of polysilanes, polygermanes, polystannanes, polyborazylenes, polyphosphazens, polysiloxanes, polydimethsiloxanes, polymethylhydrosiloxanes, polydiphenysiloxanes, polysilazanes, perhydridopolysilazanes, polyphosphazenes, poly(dichlorophosphazene)s, poly(sulfur nitride)s, polythiazyls, and polysulfidies, or a mixture thereof. In accordance with some embodiments, the inorganic polymeric materials can be selected from the group consisting essentially of portland cement, portland cement and silicon dioxide, glasses, vycor glasses, borosilicate glases, polyanionic glasses, poly(carbosilane)s, and mixtures thereof. The organometallic compounds and organometallic polymeric materials comprise materials containing the main group elements of silicon and germanium, transition metals (having atomic numbers 22-30, 40-48 and 72-80), rare earth elements (having atomic numbers 21, 39, and 57-71), and elements having atomic numbers of 1, 5-9, 15, 17, 35, 53 and 85.

Furthermore, the distribution of the elongated, thermally conductive particles in the matrix material can overcome damage and/or degradation from mechanical deformations such as those encountered due to thermal expansion material mismatches. Further, performance is maintained during mechanical deformation such as tensile elongation. For example, during a mechanical deformation, tube-to-tube contact is preserved as one tube slides down the length of another. Moreover, a polymer matrix containing graphene structures can substantially reduce corrosion and/or cross connection of the elongated, thermally conductive particles. For example, thermal interface materials comprising coated graphene structures within a polymeric matrix can provide corrosion protection to metals, preferably to metals susceptible to galvanic corrosion. It can be appreciated that low concentrations of graphene structures within a polymeric matrix (such as without limitation, no more than about 5 volume %) substantially maintains the polymeric matrix properties (such as without limitation, lightweight, durable, process-ability, cost, etc.).

Figure 10:
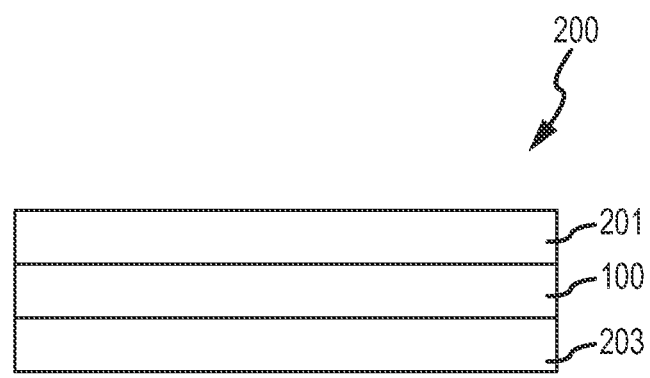
FIG. 10 depicts a system according to some embodiments.

Some embodiments include a system 200 (FIG. 10) having a thermal interface material 100 positioned between a first surface 201 and a second surface 203. The thermal interface material 100 has a conductive, percolated network 102 (not depicted) having elongated, thermally conductive particles distributed throughout a matrix material.

Figure 11:
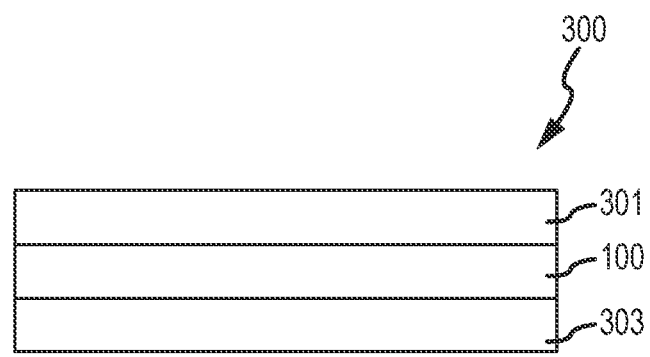
FIG. 11 depicts a device according to some embodiments.

Some embodiments include a device 300 (FIG. 11) having a first component 301, a second component 303, and thermal interface material 100 positioned between the first 301 and second 303 components. The thermal interface material 100 comprises a conductive, percolated network 102 (not depicted) having elongated, thermally conductive particles distributed throughout a matrix material. The second component 303 is a thermal energy dissipating component.

The thermal interface system 200 and/or device 300 may comprise a component and/or element in one of a power electronics application (such as but not limited to insulated gate bipolar transistor, where the thermal interface material 100 is positioned between direct bond copper layer/baseplate assembly and the heat sink); a computer application (such as but not limited to cooling of integrated circuit (IC) chips and the central processing unit (CPU) in general; TIMs providing efficient thermal pathways between processor integrated heat spreader (IHS) and heat sink); integrated circuits (ASICs); field programmable gate arrays (FPGAs); graphics processing units (GPUs) (such as but not limited to embedded systems, workstations, game consoles, mobile phones and PCs); microprocessors and flip chip bell grid arrays (BGAs); photovoltaic (PV) cells (as for example to prevent loss of power due to thermal build-up by an electrically insulative thermal interface material 100 positioned between the PV cell and a heat sink [external to the circuit]); transistors (such as without limitation, a thermal interface material 100 positioned between the heat spreader and the transistor itself [electrically insulative], audio amplifiers being a specific non-limiting example); heat pipe joints with base plates (such as without limitation thermal interface material 100 positioned between unit base plate and two-phase heat pipes for space and other applications); travelling wave tube amplifiers (TWTAs) (such as without limitation thermal interface material 100 positioned between the TWTA housing (heat source) and heat spreader [space applications]); power electronics components in remotely piloted aircraft (RPA), unmanned air vehicles and micor air vehicles (UAVs and MAVs), F-22 and F-35 systems as for example cooling of metal-oxide-semiconductor field-effect transistors (MOSFETs); directed energy weapons (such as for example components that require thermal management can benefit from thermally conductive nanocomposites, e.g., cooling of solid state laser components and casings, cooling of high-voltage electronic components driving the lasers); solid state relays (SSRs) (such as for example without limitation, positioning of the thermal interface material 100 between the relays and heat spreader in the form of thermal pads and thermal grease); thermal management for high power laser, high power radar, high power vehicle radiator (such as without limitation positioning the thermal interface material 100 for enhanced thermal contact between high power electronics and corresponding microchannel heat sinks used for heat dissipation); complementary metal-oxide semiconductors (CMOS), telecommunications, active sensing and imaging technologies; heat sink materials; applications involving polymer composites benefitting greatly from the inclusion of a themally conductive polymer nanocomposite (e.g., in place or complementing the original polymer) such as heat sink materials, structural composites, LED fixtures (including thermal pads, thermal substrates and thermal grease applied as a conformable TIM between LEDs and heat sinks), housings/enclosures for electrical and electronic components, electrical connectors, IC assembly, under-hood component cooling for automobiles radiator end caps for high performance vehicles, fuel pumps, and pipe/tubing in industrial applications that are frequently exposed to temperature variations (transporting hot fluids, for example), aeronautical and/or space vehicle airframes, structures, and/or sub-structures, aeronautical and/or space structures (in general) such as satellites, booms, arrays, hinges, etc. and/or IGBT/CMOS cooling applications in electric vehicles; large capacitors and ultracapacitors (such as without limitation the positioning of the thermal interface material between the large capaciator and/or ultracapacitor and the heat sinks/spreaders); thermally conductive adhesives based on the same technology can be used to replace mechanical restraints (like screws) in capacitors, inductors, and automotive electronics while providing pathways of minimum thermal resistance between electronics IC board and corresponding housing; thermal management and electrical ground for the IC board; electronics chip cooling (IGBTs, BGAs, IC chips etc.) in portable electronics such as cell phones, smartphones, laptops, tablets, tablet PCs, netbooks; enhanced heat exchange heat between the human body and personal cooling systems such as personal refrigerant based and TE module based coolers; thermal management of solar cells for performance efficiency and lifespan enhancement; cooling of telecom amplifier modules, power modules, wireless network card, general printed circuit board (PCB) protection against thermal and mechanical shocks; and combinations thereof.

In some configurations the first and second surfaces, respectively, have first and second surface energies. Furthermore, the first and second surfaces can in some instances contain surface irregularities, that is the respective surfaces may contain one or more valleys, grooves, and voids. Preferably, the matrix material has a surface energy above equal to or less than the one or both of the first and second surfaces. In other words, the matrix material sufficiently wets and/or spreads the first and second surfaces. The wetting and/or spreading of the matrix material, that is the thermal interface material 100, substantially wets and spreads over the one or more valleys, grooves, and voids of the first and second surfaces. The wetting and/or spreading over the matrix material, that is the thermal interface material 100, forms a contact of the first and second surfaces with the thermal interface material 100 substantially lacking voids and/or air pockets between the thermal interface material 100 and the first and second surfaces, respectively.

In some configurations the first and second components, respectively, have first and second component surface energies. Furthermore, the first and second component surfaces can in some instances contain surface irregularities, that is the respective surfaces may contain one or more valleys, grooves, and voids. Preferably, the matrix material has a surface energy above equal to or less than the one or both of the first and second component surfaces. In other words, the matrix material sufficiently wets and/or spreads the first and second component surfaces. The wetting and/or spreading of the matrix material, that is the thermal interface material 100, substantially wets and spreads over the one or more valleys, grooves, and voids of the first and second component surfaces. The wetting and/or spreading over the matrix material, that is the thermal interface material 100, forms a contact of the first and second surfaces with the thermal interface material 100 substantially lacking voids and/or air pockets between the thermal interface material 100 and the first and second component surfaces, respectively.

Preferably, in system 200 one or more of the elongated, thermally conductive particles are in contact with the first surface 201. Similarly, in device 300 one or more of the elongated, thermally conductive particles are preferably in contact with the first component 301. Likewise in system 200, one or more of the elongated, thermally conductive particles preferably are in contact with the second surface 203. Moreover, in device 300 one or more of the elongated, thermally conductive particles are preferably in contact with the second component 303. It is believed that the contacting of the one or more elongated, thermally conductive particles, respectively, with the first and/or second surfaces and the first and/or second components provides for more efficient and/or greater thermal conductivity.

EXAMPLES

Examples

Introduction

Thermal interface boundary resistance between the constituents substantially contributes to thermal conductivity losses in a multiple constituent (i.e., composite) thermal interface material. The thermal interface boundary resistance is typically measured at the junction where the constituents are at their closest proximity to one another. Heat transfer between the constituents is believed to occur through charge carriers (electrons and holes) and phonons. Materials that are electrically conductive tend to transfer heat energy primarily through charge carriers, whereas materials that are electrical insulators and/or semi-conductors tend to transfer thermal energy primarily through phonon transport.

If the constituents are dissimilar materials, the heat transfer is believed to occur through one of the following: (1) from one charge carrier to another charge carrier (typically the process between highly electrically conductive materials such as metals); (2) from a charge carrier to a phonon carrier (typically the process for thermal transfer form a metal to an insulator); (3) from one phonon carrier to another phonon carrier (typically the thermal transfer process from one insulator to another); and (4) from a phonon carrier to a charge carrier (typically the thermal transfer from an insulator to a metal). Typically, strong and/or excessive phonon emission occurs when the thermal transfer is between a charge carrier (such as an electrically conductive metal) and semiconductor (such as a polymer, some ceramics, and most carbon nano-tubes, among other examples).

Figure 12:
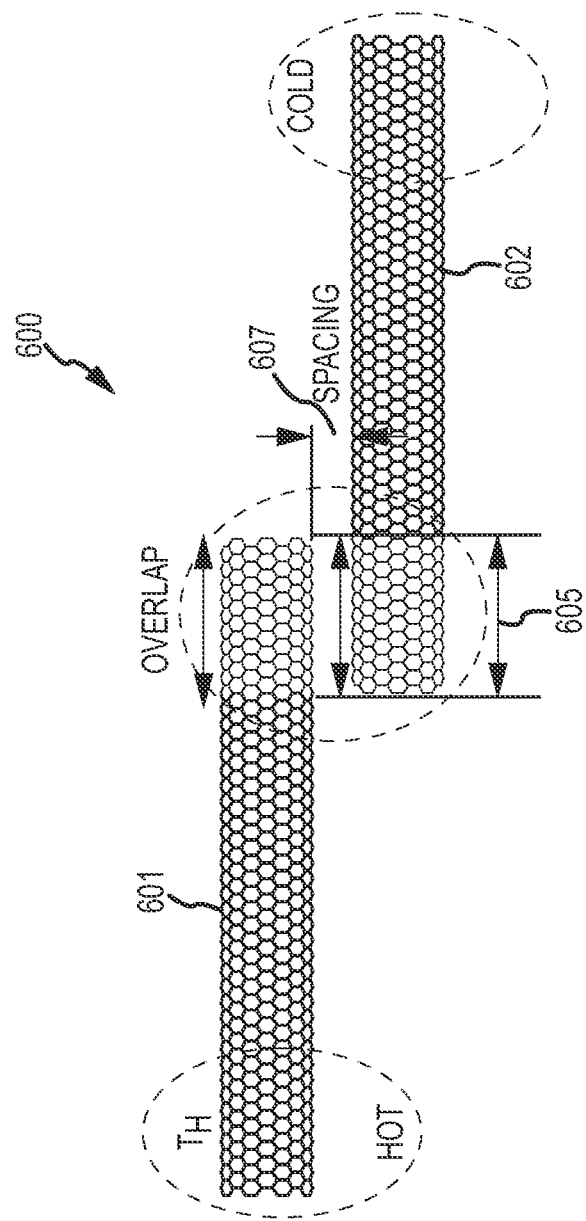
FIG. 12 depicts prior art of a thermal interface in accordance with some embodiments.

Existing modeling efforts have demonstrated ways to improve thermal conductivity. For example, FIG. 12 depicts prior art of a thermal interface 600 between a first 601 and second 602 carbon nano-tubes. The thermal interface 600 comprises first 601 and second 602 carbon nano-tube overlap length 605 and separation distance 607 between the first 601 and second 602 carbon nano-tubes. Thermal resistance modeling studies showed that the thermal resistance between the carbon nano-tubes decreases as the overlap length 605 between tubes increases. This believed to be due to more atoms from the first 601 and second 602 carbon nano-tubes are able to exchange heat through phonon interactions. Similarly, the modeling studies showed that tube-to-tube thermal resistance decreases with decreases in the separation distance 607. The decreases in thermal resistance due to deceases in separation distance 607 and increases in overlap length 605 were non-linear. Moreover, exponential, orders of magnitude changes in thermal resistance were observed for relatively small changes in one or both of the overlap length 605 and separation distance 607. From the modeling studies, it is believed that reductions in thermal interface resistance can when carbon nano-tubes are relatively large overlap lengths and relatively small separation distances. Furthermore, the modeling study showed that heat transfer along carbon nano-tubes is primarily through phonons, and that the thermal resistance between adjacent carbon nano-tubes is substantially limited by phonon-phonon interactions between the carbon nano-tubes and/or surrounding matrix material. Decreasing the thermal resistance between the carbon nano-tubes and/or surrounding matrix material is one possible method for increasing the heat transfer between adjacent carbon nano-tubes. One method for decreasing the thermal resistance between adjacent carbon nano-tubes is by replacing at least some, if not all, of the phonon-phonon transfer between adjacent nano-tubes with a charge carrier transfer.

While not wanting to be bound by any theory, it is believed that at least some, if not all, of the phonon-phonon transfer between adjacent nano-tubes could be replaced with a charge carrier transfer process by applying a coating material having a short electron-phonon coupling length to the carbon nano-tubes. For example, a coating having a short electron-phonon coupling length is one that offers an intrinsic ability to efficiently couple phonons into electrons. This ability to couple phonons into charged carriers is believed to substantially conduct thermal energy in the form of phonons through charged particle process. For example, the short electron-phonon coupling length coating material can take advantage of efficient phonon-to-electron thermal energy transfer mechanisms (e.g., electron and/or hole hopping or tunneling) to effectively eliminate phonon scattering and/or phonon losses due to high thermal resistance. In other words, the short electron-phonon coupling length coating material provides for efficient thermal energy transport through an electron and phonon transport process.

Materials having a short electron-phonon coupling length are typically semiconductor materials and electrical conductive materials. Semiconductor materials can conduct thermal energy through one or both of charged particles and phonons. Highly conductive materials typically conduct thermal energy through charged particles.

Nano-Tubenano-Tubenano-Tube Example 1

Silver Plated Carbon Nano-Tubes

Carbon nano-tubes were coated by silver metal via the thermal decomposition of a silver salt. Several examples of silver salts that thermally decompose to silver metal are known. Commercially available carbon nano-tubes offered with a hydrophilic surface treatment were utilized to facilitate direct silver metal coating. This surface chemistry was selected to create intimate contact between the carbon nano-tube and silver salt complex. Carbon nano-tubes were introduced into a polymer matrix via grinding. The addition of the silver salt complex was introduced in portions, and the carbon nano-tube and silver salt complex were further dispersed in the polymer matrix via grinding.

Figure 13:
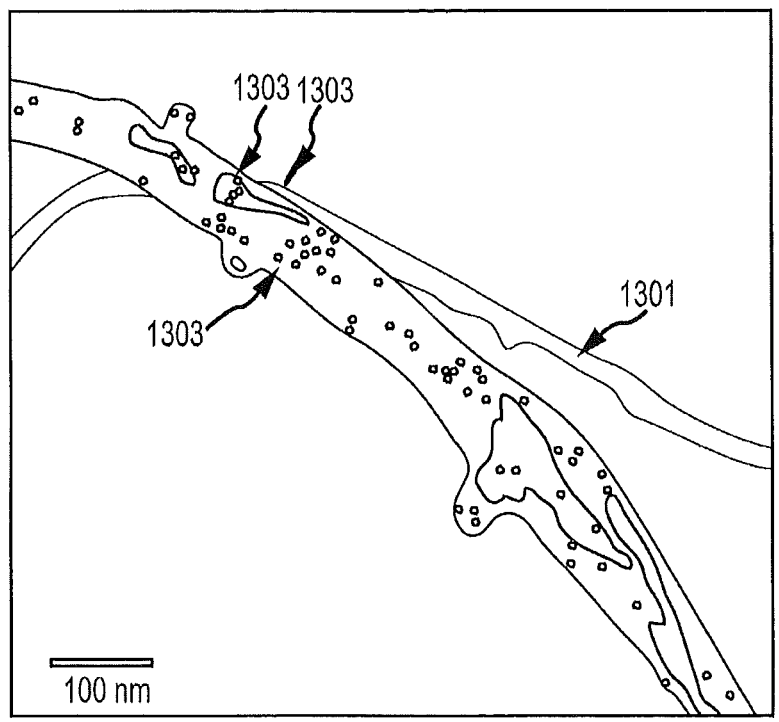
FIG. 13 depicts a transmission electron microscope image of silver metal-coated carbon nano-tubes in accordance with some embodiments.
Figure 14:
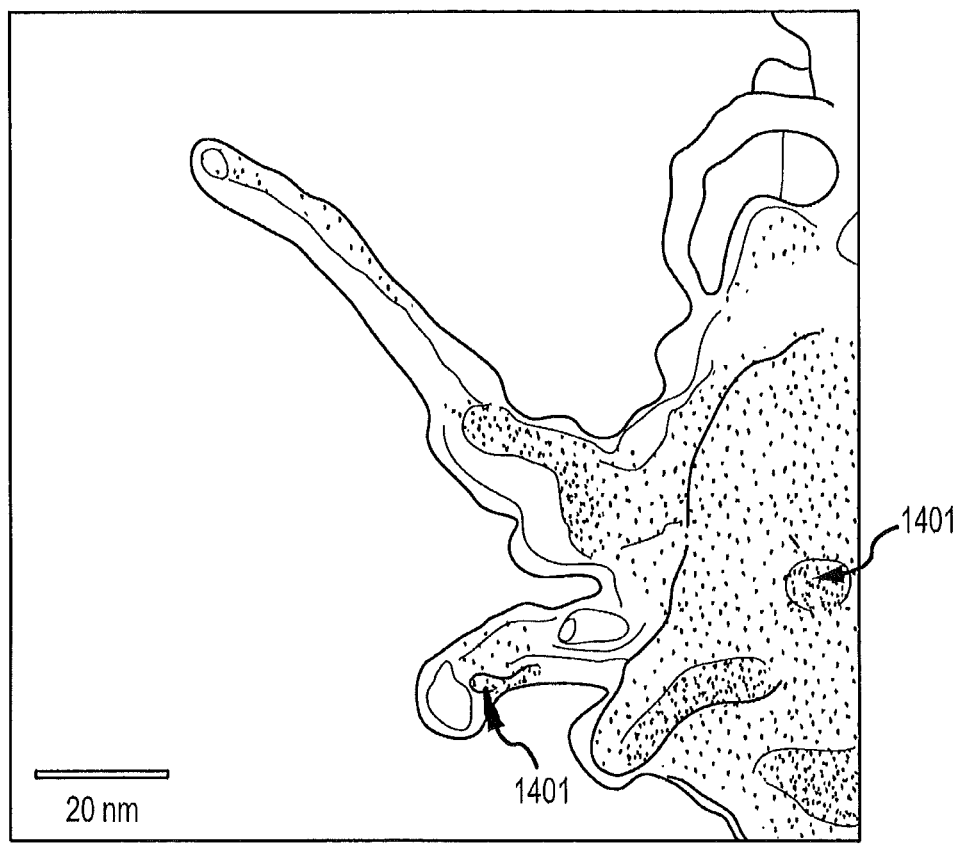
FIG. 14 depicts a high resolution scanning tunneling electron microscope image of a silver metal-coated carbon nano-tube in accordance with some embodiments.

FIG. 13 includes a transmission electron microscope image of silver metal-coated carbon nano-tubes 1301. FIG. 14 is a high resolution scanning tunneling electron microscope image of a silver metal-coated carbon nano-tube. These micrographs illustrate that silver plating is observed as bright spots 1303 on carbon nano-tubes from annular dark field in FIG. 13 and dark spots 1401 on carbon nano-tubes from bright field imaging in FIG. 14. Moreover, analytical methods confirmed the presence of metallic silver.

Figure 15:
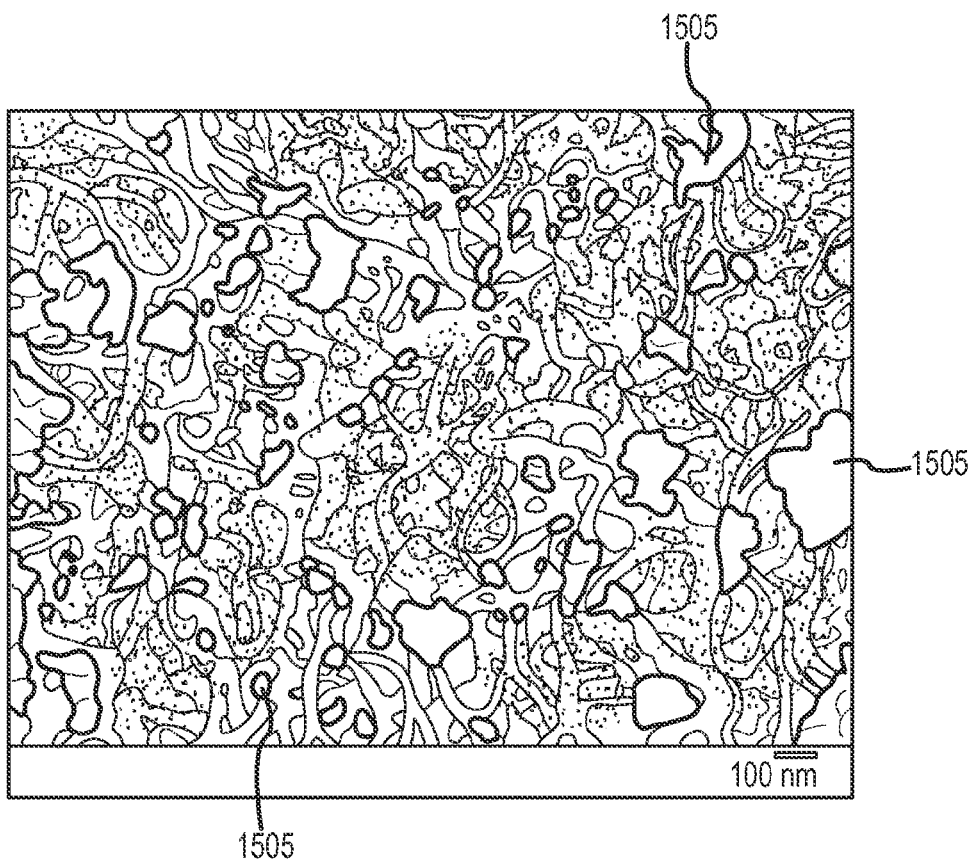
FIG. 15 depicts a scanning electron microscope image of a thermal interface material in accordance with some embodiments.

FIG. 15 is a scanning electron microscope image of a thermal interface material after gradual heating to an elevated temperature. The electron micrograph image shows silver-plating, as depicted by bright spot images 1505 on the surface of the carbon nano-tubes. The gradual heating to elevated temperature thermally degraded the organic matrix material resulting in silver-plating on to the surface of the carbon nano-tubes.

A number of material combinations have been established to promote thermal energy transfer. Tables 1 and 2 presents example combinations of materials that are offered commercially. The present invention is directed generally to the use of coated graphene structures and/or graphene structures embedded in a matrix that is characterized by short electron-phonon coupling lengths.

TABLE 1

Examples of commercially-available, material combinations that promote thermal energy transfer.

| Materials with high aspect ratio, high thermal conductivity, & energy transfer by electronic transport | Materials with short electron-phonon coupling lengths |
|---|---|
| Metallic CNTs[a] | Lanthanide-doped nanolattices (e.g., GaN w/Eu; BaY$_2$F$_8$ w/Tm, Ho, or Dy) |
| Metal Nao-wires (e.g., Ag$^0$, Cu$^0$, Au$^0$)[b,c] | Superconductors (e.g., MgB$_2$, cuprates)[d] |
| Metal Nanorods (e.g., Ag$^0$, Cu$^0$, Au$^0$)[b,c] | Thermoelectrics (e.g., Bi$_2$Te$_3$, CdS, GaP, etc.) |
| | Metals (e.g., Cu$^0$, Ag$^0$, Al$^0$) |

[a]e.g., Southwest NanoTechnologies (or SWeNT), NanoCyl, etc.
[b]e.g., SeaShell Technologies, NanoAmor, READE, etc.
[c]e.g., Columbus Superconductors

TABLE 2

The electron-phonon coupling length of a variety of semiconductors including thermoelectric materials and metals.

| Material | L · cm |
|---|---|
| Ge | $1.7 \cdot 10^{-4}$ |
| Si | $5.9 \cdot 10^{-5}$ |
| GaAs | $4.0 \cdot 10^{-4}$ |
| InSb | $1.0 \cdot 10^{-4}$ |
| Bi Te | $5.5 \cdot 10^{-5}$ |
| CdS | $5.6 \cdot 10^{-6}$ |
| CdSe | $2.7 \cdot 10^{-5}$ |
| HgSe | $9.1 \cdot 10^{-4}$ |
| GaP | $7.1 \cdot 10^{-6}$ |
| InP | $2.3 \cdot 10^{-4}$ |
| PbTe | $7.7 \cdot 10^{-5}$ |
| HgTe | $1.0 \cdot 10^{-3}$ |
| Sn | $4.0 \cdot 10^{-6}$ |
| Pb | $2.6 \cdot 10^{-6}$ |
| In | $5.6 \cdot 10^{-6}$ |
| Cu | $2.0 \cdot 10^{-6}$ |
| Ag | $2.1 \cdot 10^{-5}$ |
| Au | $1.2 \cdot 10^{-5}$ |

Example 2

Bismuth Telluride Crystal Growth on Carbon Nano-Tubes

Figure 16:
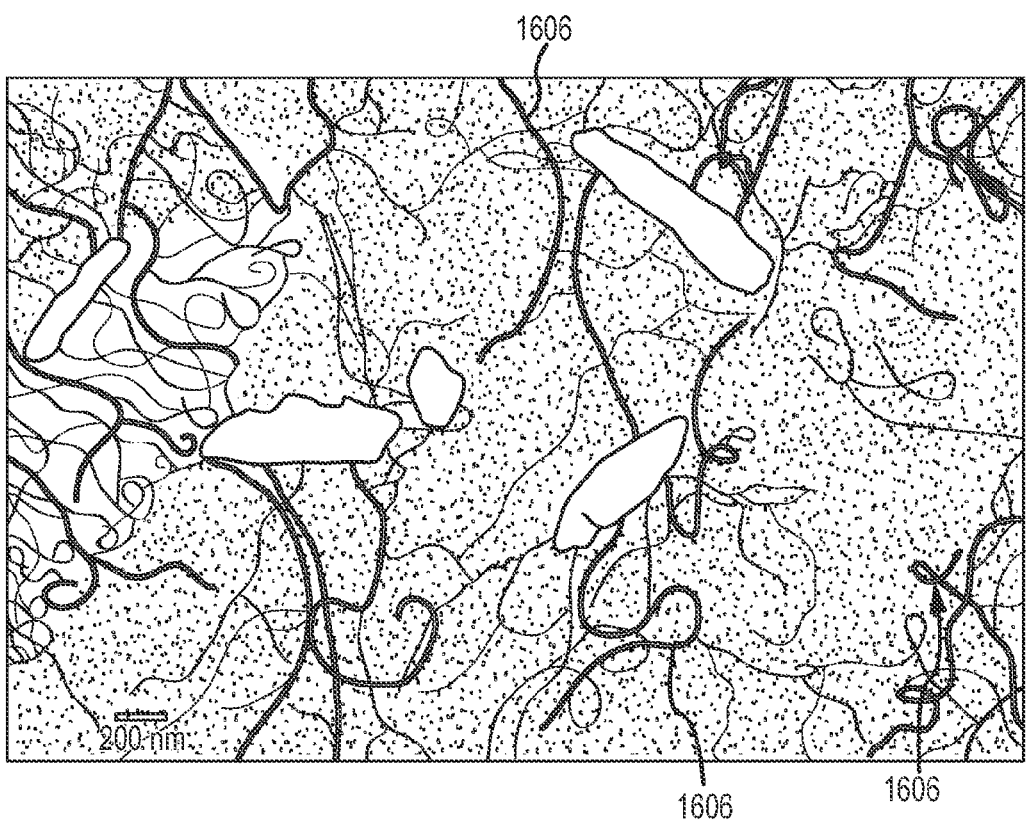
FIG. 16 depicts SEM image showing bismuth telluride ($Bi_2Te_3$) coated carbon nano-tubes.

Bismuth telluride crystals were grown on the surface of carbon nano-tubes leaving a semi-continuous coating (FIG. 16) and their presence was confirmed through analytical means. These materials were then integrated into a polymer matrix in the fabrication of thin films.

Example 3

Carbon Nano-Tube and Silver Nano-Wire Thin Films and/or Pastes

Thin film and paste specimens were prepared from the embedment of carbon nano-tubes and/or silve metal nao-wires. Specimens were prepared via a vacuum filtration procedure from a co-suspension of carbon nano-tubes and silver nao-wires. FIG. 13 graphically depicts the fabrication process. As anticipated, as the suspension concentrations increased, the specimen thickness and material density also increased.

Carbon nano-tube-silver nao-wire paste specimens were prepared via grinding these materials into a polymer matrix. The selection of the polymer matrix was based upon two main factors: 1) prior experience that demonstrated a high-level of carbon nano-tube dispersion when mixed and ground, and 2) the ability to fabricate pastes that are suitable for thermal conductivity measurement via ASTM-D5470—Standard Test Method for Thermal Transmission Properties of Thermally Conductive Electrical Insulation Materials. Suspensions of silver nao-wires in organic solvent were obtained from Seashell Technologies, Inc. (San Diego, Calif.) and added in portions to polymer-carbon nano-tube dispersions by slow evaporation of the organic solvent.

Figure 17:
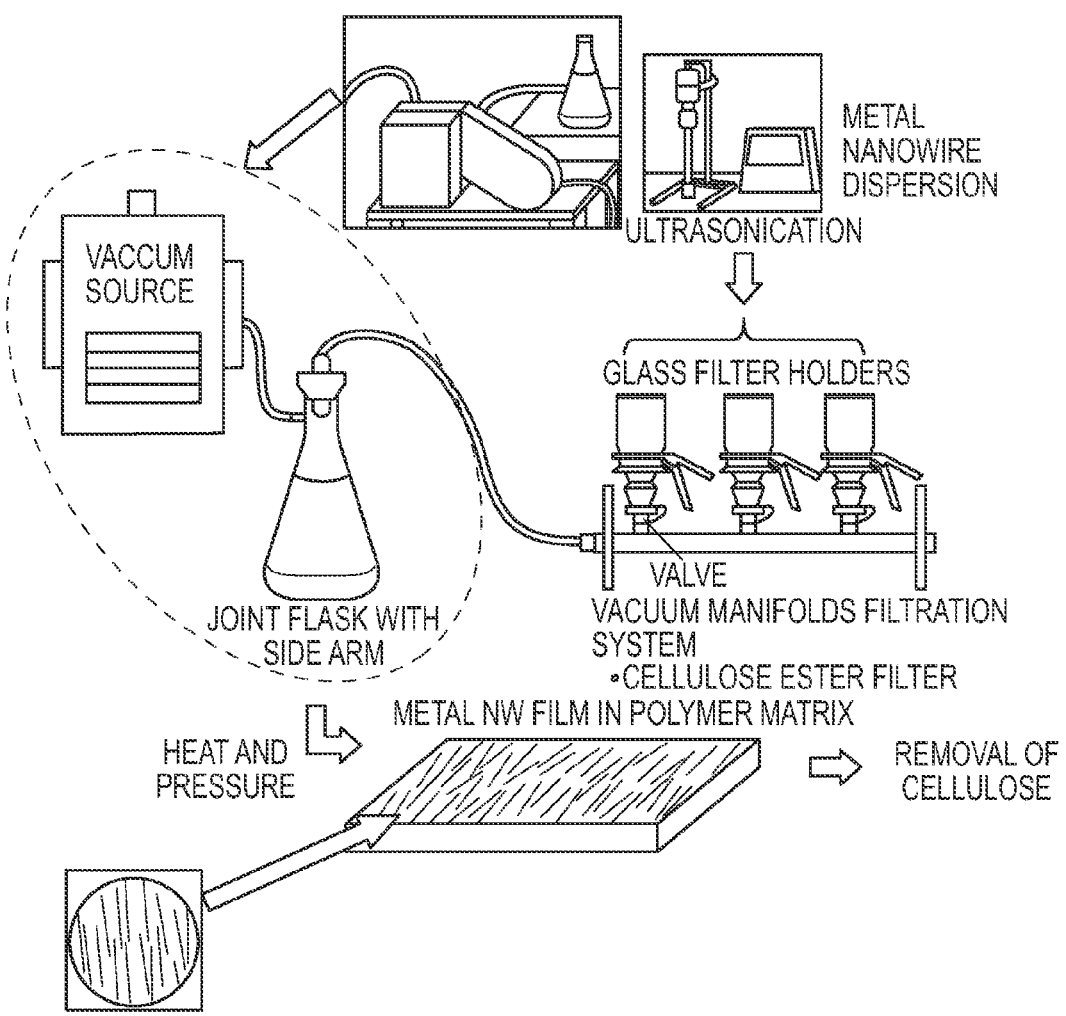
FIG. 17 depicts graphical representation of the fabrication process of metal nao-wire film in polymer matrix.

Thin film and paste specimens were prepared from the embedment of carbon nano-tubes and/or silve metal nao-wires. Specimens were prepared via a vacuum filtration procedure from a co-suspension of carbon nao-tubes and silver nao-wires. FIG. 17 graphically depicts the fabrication process. As suspension concentrations increased, the specimen thickness and material density also increased. The process involves forming a particulate suspension of the elongated, thermally conductive particles in a solvent that may or may not have the matrix material suspended and/or dissolved within the solvent to form a mixture. The particulate suspension is subjected to ultrasonic energy to form a distribution of the suspended elongated, thermally conductive particles within the solvent prior to a mixture. The mixture is filtered, preferably using a vacuum filtration process to form a wet matrix of elongated, thermally conductive particles. The wet matrix is subjected to one or both of heat and pressure to form the percolated network of elongated, thermally conductive particles within the matrix material.

Figure 18:
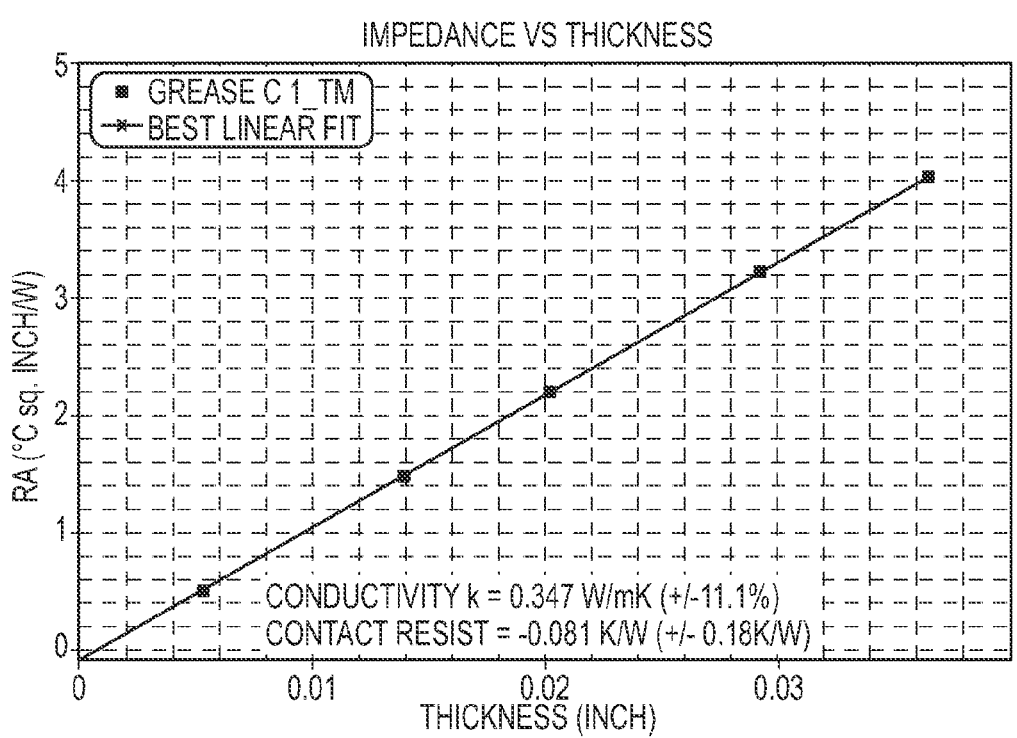
FIG. 18 depicts thermal conductivity plot derived from ASTM D5470 for silver-coated carbon nano-tubes in a dispersion.

FIG. 18 presents an example thermal conductivity plot for coated carbon nano-tubes in a polymer matrix. Increases of 200% or greater were demonstrated. Table 3 summarizes the thermal conductivity data.

TABLE 3

Thermal conductivity data summary for paste specimens & ILEs (control).
polymer matrices.

| Material System | Thermal Conductivity (W/mK) |
| --- | --- |
| Polymer matrix | 0.170 |
| 4 wt % carbon nao-tubes & silver nao-wires (1:1 by wt.) in polymer | 0.320 |
| 4 wt % silver-coated CNTs (1:1 by wt.) in polymer | 0.347 |

A number of variations and modifications of the disclosure can be used. It would be possible to provide for some features of the disclosure without providing others.

The present disclosure, in various embodiments, configurations, or aspects, includes components, methods, processes, systems and/or apparatus substantially as depicted and described herein, including various embodiments, configurations, aspects, sub-combinations, and subsets thereof. Those of skill in the art will understand how to make and use the present disclosure after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention that the claimed material requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the disclosed description has included description(s) of one or more embodiments, configurations, or aspects and certain variations and modifications, other variations, combinations, and modifications are within the scope of the disclosure e.g., as may be within the skill and knowledge of those in the art, after understanding of the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A composition, comprising:
a conductive, percolated network having elongated, thermally conductive particles distributed throughout a matrix material, wherein the elongated, thermally conductive particles comprise no more than 20 volume % of the composition, wherein the matrix material comprises at least about 80 volume % of the composition, wherein the elongated, thermally conductive particles are selected from the group consisting essentially of metallic nano-wires, metallic alloy nano-wires, metallic carbon nano-tubes, coated-elongated particles, and combinations and/or mixtures thereof, wherein the elongated thermally conductive particles comprise a coating having an electron-phonon coupling length of no more than about $1 \times 10^{-2}$ cm, wherein the coated-elongated particles are selected from the group consisting essentially of coated carbon nano-tubes, coated graphene sheets, coated-elongated graphite particles and mixtures thereof, and wherein the coated-elongated particles are coated with a coating material containing one or more of Ge, Si, Ga, As, In, Sb, Bi, Te, Cd, S, Se, Hg, P, Pb, Sn, Cu, Ag, Au, binary combinations in any atomic ratio thereof, tertiary combinations in any atomic ratio thereof, and other combinations thereof.

2. The composition of claim 1, wherein the composition comprises no more than about 15 volume % of the elongated, thermally conductive particles and wherein the elongated, thermally conductive particles have an average aspect ratio of at least about 25:1.

3. The composition of claim 2, wherein the aspect ratio is greater than about 40:1.

4. The composition of claim 2, wherein the aspect ratio is greater than about 100:1.

5. The composition of claim 1, wherein the elongated, thermally conductive particles have at least one of an average diameter and thickness from about 0.1 to about 500 nanometers.

6. The composition of claim 1, wherein the elongated, thermally conductive particles have an average length from about 10 to about 1,000 microns.

7. The composition of claim 1, wherein the conductive, percolated network is a three-dimension network, and wherein the elongated, thermally conductive particles are distributed in an isotropic manner throughout the matrix material.

8. The composition of claim 1, wherein the elongated, thermally conductive, particles forming the percolated network have at least two low resistance pathways per elongated, thermally conductive particle.

9. The composition of claim 8, wherein the at least two low resistance pathways are between one elongated, thermally conductive particle and at least two other elongated, thermally conductive particles.

10. The composition of claim 1, wherein the conductive, percolated network is thermally conductive.

11. The composition of claim 1, wherein the composition has a thermal conductivity of at least about 2 $Wm^{-1}K^{-1}$.

12. The composition of claim 1, wherein the conductive, percolated network comprises one or both of a charge carrier and phonon conductive network.

13. The composition of claim 1, wherein the composition comprises at least about 90 volume % of the matrix material.

14. The composition of claim 1, wherein the coated-elongated particles are coated with a coating material containing one or more of Ge, Si, Ga, As, In, Sb, Bi, Cd, S, Cd, Se, Hg, P, Pb, Te, Sn, Cu, Ag, Au, binary combinations in any atomic ratio thereof, tertiary combinations in any atomic ratio thereof.

15. The composition of claim 14, wherein the matrix material is selected from the group consisting essentially of organic materials, organic polymeric materials, inorganic materials, inorganic polymeric materials, ceramics, organometallic materials, polymeric organometallic materials and combinations thereof, and wherein the organic polymeric material is selected from the group consisting essentially of homo-polymers, block co-polymers, polymeric mixtures and blends, polymeric alloys, and copolymers of polyolefins, polystyrenes, polyvinyls, polyacrylics, polyhalo-olefins, polydienes, polyoxides polyethers, polyacetals, polysulfides, polyesters, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polyketones, polythioketones, polysulfones, polysulfoxides, polysulfonates, polysulfonamides, polyphenylenes, and mixtures thereof.

16. The composition of claim 1, wherein the electron-phonon coupling length is no more than about $10^{-4}$ cm.

17. The composition of claim 1, wherein the coating has an electron-phonon coupling length from about $1\times10^{-2}$ to about $2\times10^{-6}$ cm.

18. The composition of claim 1, wherein the coated carbon nano-tubes comprise one of single-walled carbon nano-tubes, double-walled carbon nano-tubes, few-walled carbon nano-tubes, multi-walled carbon nano-tubes, or a mixture of single- and multi-walled carbon nano-tubes.

19. The composition of claim 1, wherein the composition has first and second surfaces.

20. The composition of claim 19, wherein the conductive, percolated network comprises no more than about 5% by volume of the elongated thermally conductive particles and at least about 95% by volume matrix material and wherein the conductive, percolated network comprises one or both of a charge carrier and phonon conductive network.

21. A composition, comprising:
a conductive, percolated network having elongated, thermally conductive particles distributed throughout a matrix material, wherein the elongated, thermally conductive particles comprise coated carbon nano-tubes, wherein the coated carbon nano-tubes comprise no more than 20 volume % of the composition, wherein the matrix material comprises at least about 80 volume % of the composition, wherein the matrix material is selected from the group consisting essentially of organic materials, organic polymeric materials, and combinations thereof and wherein the elongated thermally conductive particles comprise a coating having an electron-phonon coupling length of no more than about $1\times10^{-2}$ cm.

22. The composition of claim 21, wherein the coated carbon nano-tubes have an average aspect ratio of at least about 25:1, wherein the percolated network is a three-dimension network, wherein some of the coated carbon nano-tubes forming the percolated network have at least two low resistance pathways per coated carbon nano-tube, and wherein the at least two low resistance pathways are between one coated carbon nano-tube and at least two other coated carbon nano-tubes.

23. The composition of claim 21, wherein the composition has a thermal conductivity of at least about 2 $Wm^{-1}K^{-1}$.

24. The composition of claim 21, wherein the conductive, percolated network comprises one or both of a charge carrier network and phonon conductive network, wherein the composition comprises about 90 volume % or more of the matrix material.

25. The composition of claim 21, wherein the coated average aspect ratio is one of at least about 40:1 and at least about 100:1.

26. The composition of claim 21, wherein the organic polymeric material is selected from the group consisting essentially of homo-polymers, block co-polymers, polymeric mixtures and blends, polymeric alloys, and copolymers of polyolefins, polystyrenes, polyvinyls, polyacrylics, polyhalo-olefins, polydienes, polyoxides, polyethers, polyacetals, polysulfides, polyesters, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polyketones, polythioketones, polysulfones, polysulfoxides, polysulfonates, polysulfonamides, polyphenylenes, and mixtures thereof.

27. The composition of claim 21, wherein the elongated thermally conductive particles comprise a coating having an short electron-phonon coupling length of no more than about $1\times10^{-2}$ cm.

28. The composition of claim 21, wherein the composition has first and second surfaces.

29. The composition of claim 28, wherein the coated carbon nano-tubes are coated with a coating material containing one or more of Ge, Si, Ga, As, Sb, Bi, Te, Cd, S, Se, Hg, P, In, Pb, Sn, Cu, Ag, Au, binary combinations in any atomic ratio thereof, tertiary combinations in any atomic ratio thereof, and other combinations thereof and wherein the coated carbon nano-tubes are isotropically distributed throughout the matrix material.

30. A composition, comprising:
a conductive, percolated network having elongated, thermally conductive particles distributed throughout a matrix material and comprising no more than about 20 volume % of the composition, wherein the elongated, thermally conductive particles are coated-elongated particles selected from the group consisting essentially of coated carbon nano-tubes, coated graphene sheets, coated-elongated graphite particles and mixtures thereof, wherein the coated-elongated particles are coated with a coating material containing one or more of Ge, Si, Ga, As, Sb, Bi, Cd, S, Se, Hg, P, In, Pb, Te, Sn, Cu, Ag, Au, binary combinations in any atomic ratio thereof, tertiary combinations in any atomic ratio thereof, and other combinations thereof and wherein the elongated thermally conductive particles have an electron phonon coupling length of no more than about $1\times10^{-2}$ cm.

31. The composition of claim 30, wherein the elongated, thermally conductive particles have an average aspect ratio of at least about 25:1.

32. The composition of claim 31, wherein the aspect ratio is greater than about 40:1.

33. The composition of claim 31, wherein the aspect ratio is greater than about 100:1.

34. The composition of claim 31, wherein the elongated, thermally conductive particles have at least one of an average diameter and thickness from about 0.1 to about 500 nanometers.

35. The composition of claim 34, wherein the elongated, thermally conductive particles have an average length from about 10 to about 1,000 microns.

36. The composition of claim 30, wherein the percolated network is a three-dimension network, and wherein the elongated, thermally conductive particles are distributed in an isotropic manner throughout the matrix material.

37. The composition of claim 30, wherein the elongated, thermally conductive particles forming the conductive percolated network have at least two low resistance pathways per elongated, thermally conductive particle.

38. The composition of claim 37, wherein the at least two low resistance pathways are between one elongated, thermally conductive particle and at least two other elongated, thermally conductive particles.

39. The composition of claim 30, wherein the composition comprises at least about 80 volume % of the matrix material.

40. The composition of claim 30, wherein the matrix material is selected from the group consisting essentially of organic materials, organic polymeric materials, inorganic materials, inorganic polymeric materials, ceramics, organometallic materials, polymeric organometallic materials and combinations thereof.

41. The composition of claim 40, wherein the organic polymeric material is selected from the group consisting essentially of homo-polymers, block co-polymers, polymeric mixtures and blends, polymeric alloys, and copolymers of polyolefins, polystyrenes, polyvinyls, polyacrylics, polyhalo-olefins, polydienes, polyoxides, polyethers, polyacetals, polysulfides, polyesters, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polyketones, polythioketones, polysulfones, polysulfoxides, polysulfonates, polysulfonamides, polyphenylenes, and mixtures thereof.

42. The composition of claim 30, wherein the composition has first and second surfaces.

43. The composition of claim 42, wherein the matrix material comprises more than about 80 volume % of the composition and wherein the matrix material is selected from the group consisting of homo-polymers, block co-polymers, polymeric mixtures and blends, polymeric alloys, and copolymers of polyolefins, polystyrenes, polyvinyls, polyacrylics, polyhalo-olefins, polydenes, polyoxides, polyethers, polyacetals, polysulfides polyesters, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polyketones, polythioketones, polysulfones, polvsulfoxides, polvsulfonates, polysulfonamides, polyphenylenes, and mixtures thereof.

44. The composition claim 43, wherein the first surface has a temperature greater than the second surface.

45. The composition of claim 44, wherein the elongated, thermally conductive particles have an electron-phonon coupling length from about $1\times10^{-2}$ to about $2\times10^{-6}$ cm.

46. The composition of claim 45, wherein some of the elongated, thermally conductive particles forming the conductive percolated network have at least two low resistance pathways per elongated, thermally conductive particle and wherein the at least two low resistance pathways are between one elongated, thermally conductive particle and at least two other elongated, thermally conductive particles.

* * * * *